May 22, 1956 A. S. CLARK 2,746,068
INSOLE LIP CUTTING AND SCORING MACHINES
Filed Oct. 10, 1951 14 Sheets-Sheet 1

Inventor
Alfred S. Clark
By his Attorney
Thomas J. Ryan

May 22, 1956   A. S. CLARK   2,746,068
INSOLE LIP CUTTING AND SCORING MACHINES
Filed Oct. 10, 1951   14 Sheets-Sheet 2

Inventor
Alfred S. Clark
By his Attorney
Thomas Ryan

May 22, 1956   A. S. CLARK   2,746,068
INSOLE LIP CUTTING AND SCORING MACHINES
Filed Oct. 10, 1951   14 Sheets-Sheet 4

Inventor
Alfred S. Clark
By his Attorney
Thomas J. Ryan

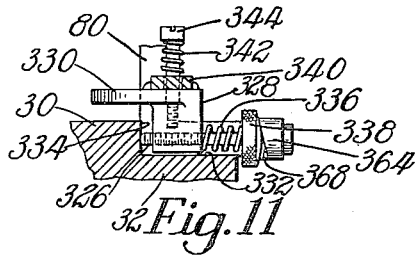
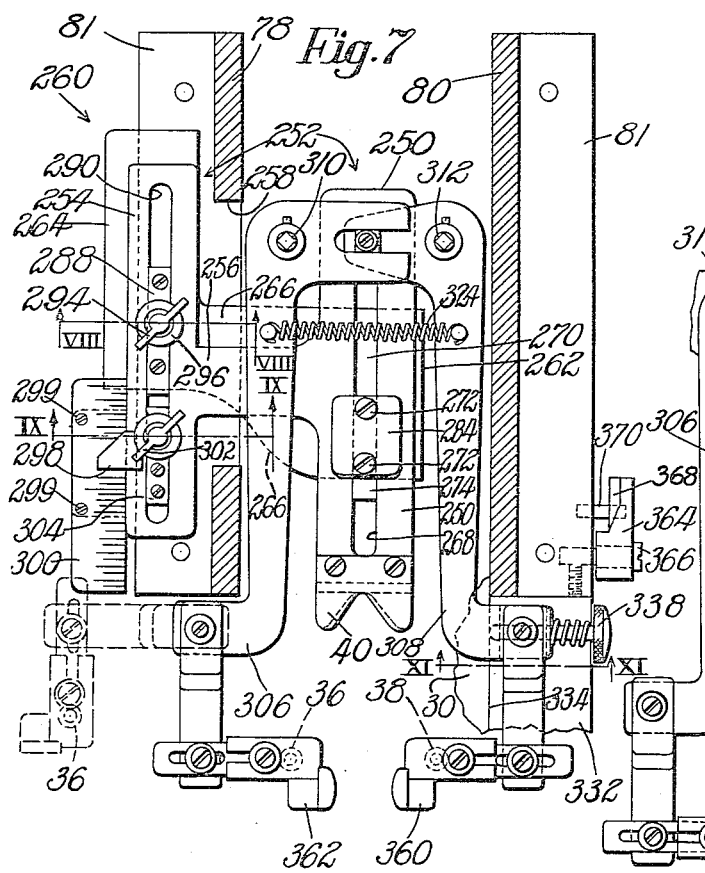
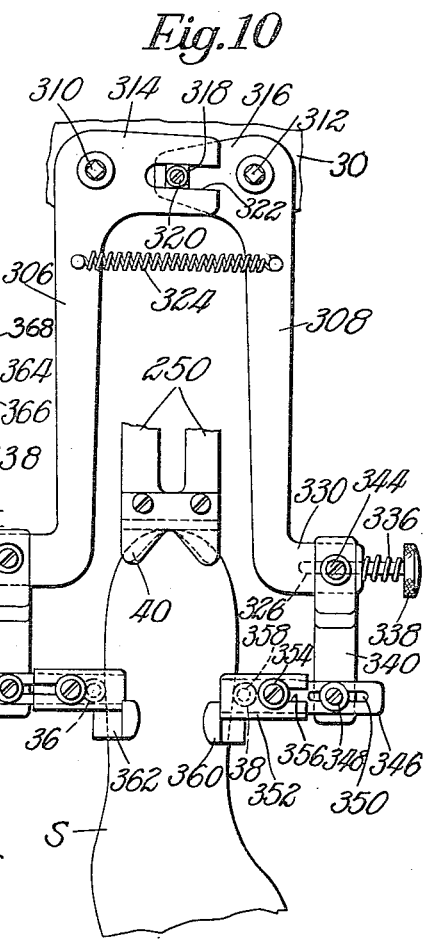
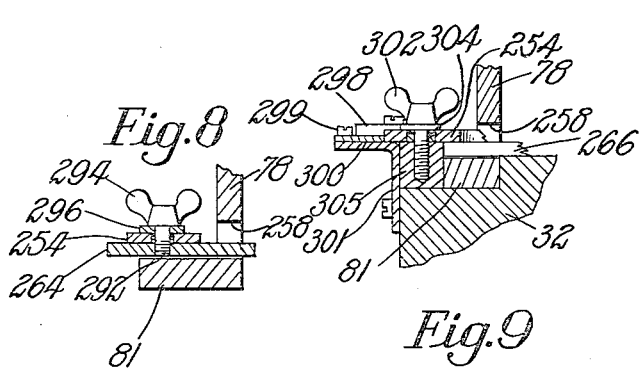

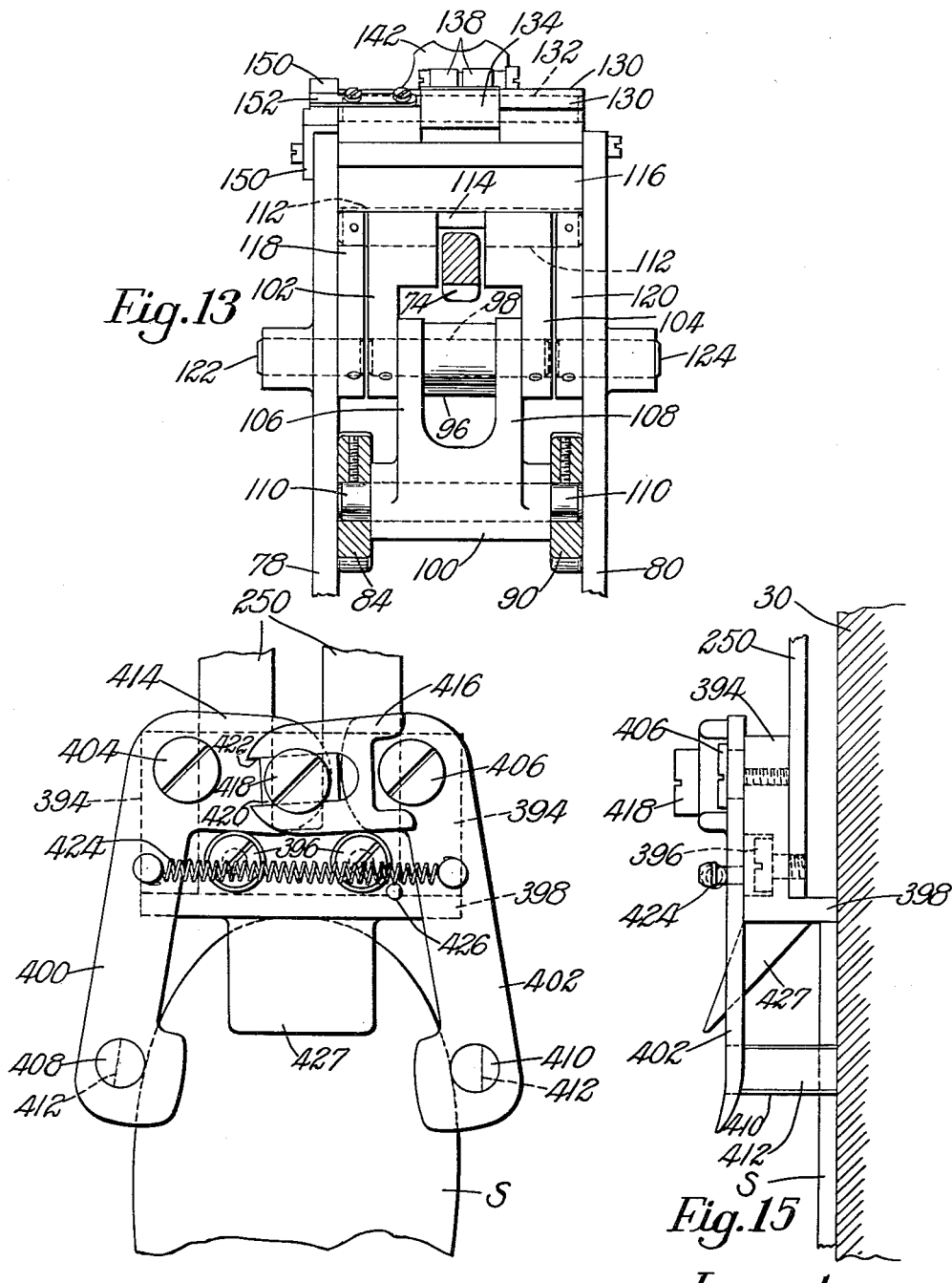

May 22, 1956     A. S. CLARK     2,746,068
INSOLE LIP CUTTING AND SCORING MACHINES
Filed Oct. 10, 1951     14 Sheets-Sheet 8
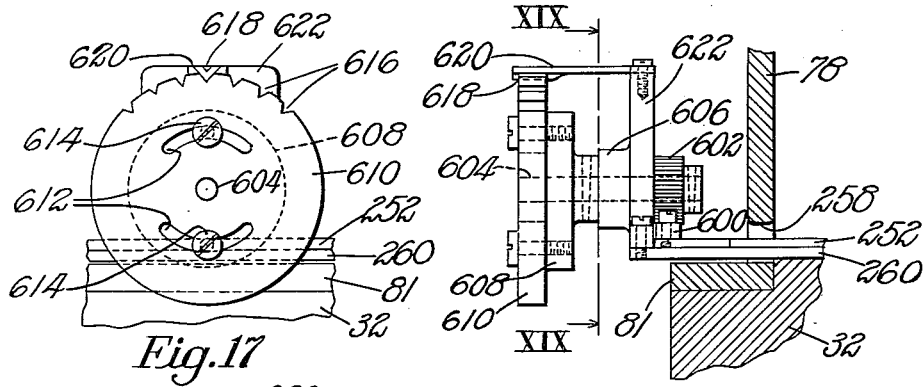
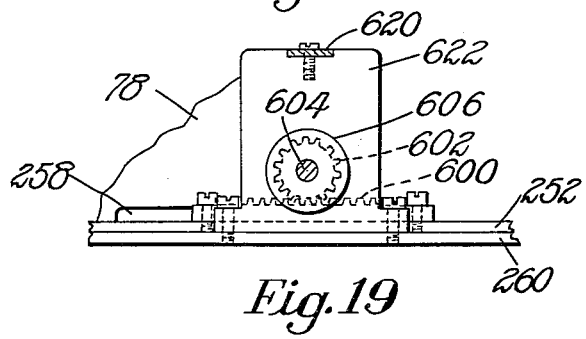
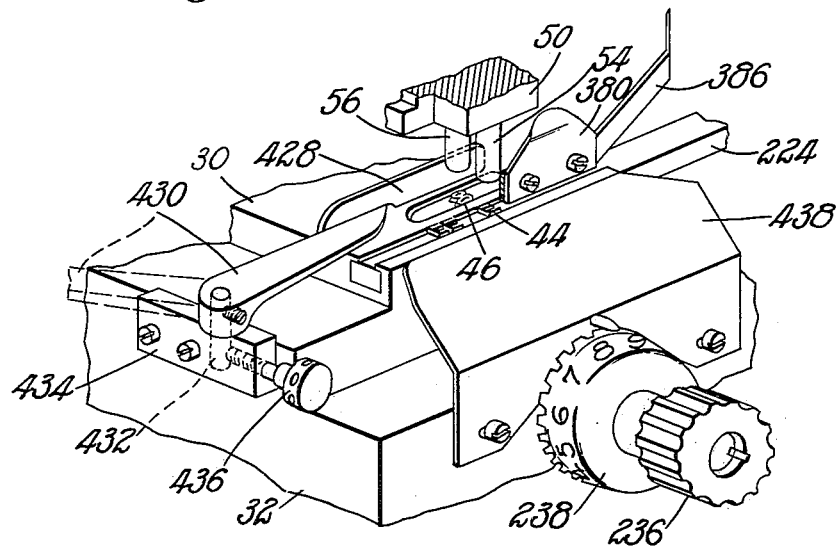
*Inventor*
Alfred S. Clark
By his Attorney
Thomas J. Ryan May 22, 1956  A. S. CLARK  2,746,068
INSOLE LIP CUTTING AND SCORING MACHINES
Filed Oct. 10, 1951  14 Sheets-Sheet 9

Inventor
Alfred S. Clark
By his Attorney
Thomas J. Ryan

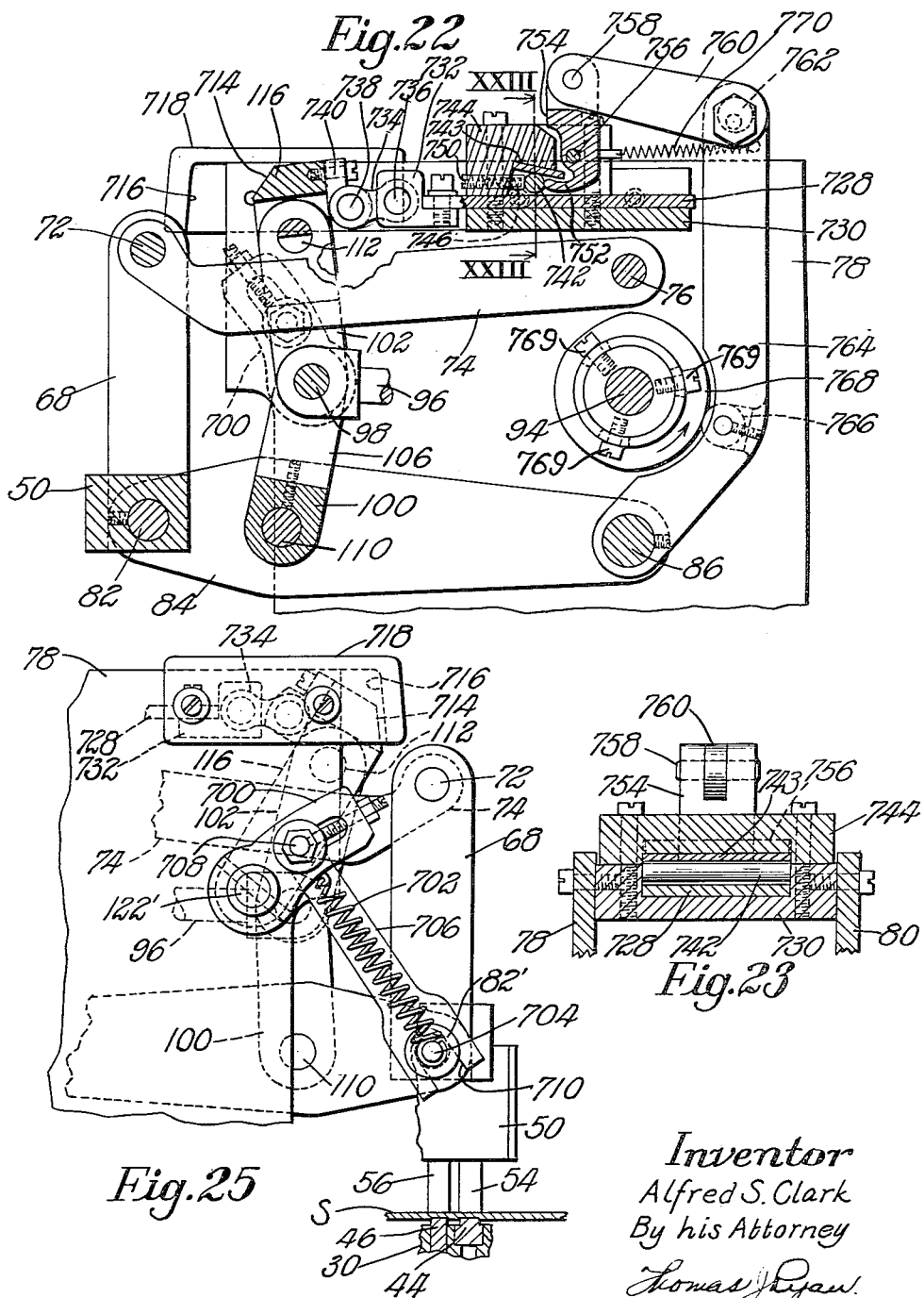

May 22, 1956 A. S. CLARK 2,746,068
INSOLE LIP CUTTING AND SCORING MACHINES
Filed Oct. 10, 1951 14 Sheets-Sheet 11

Inventor
Alfred S. Clark
By his Attorney
Thomas J. Ryan

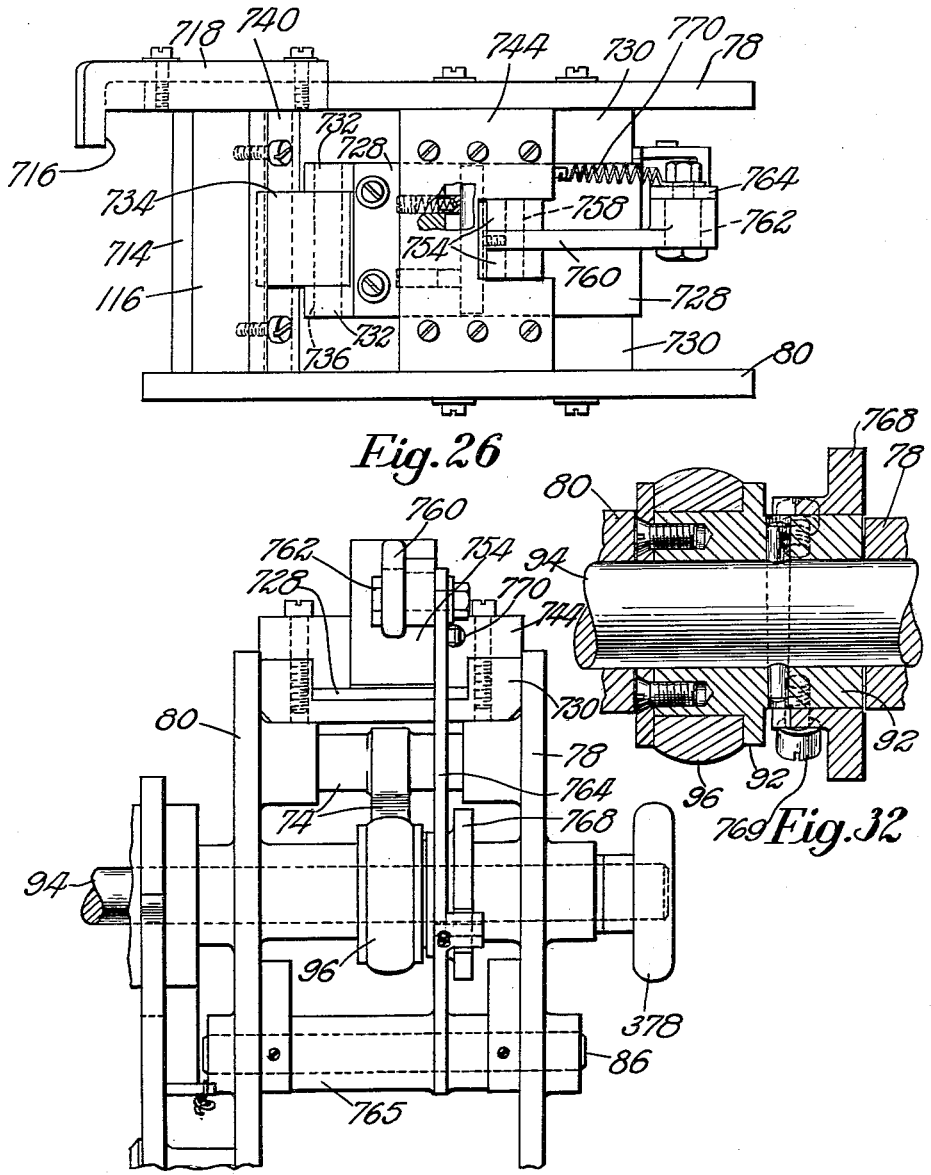

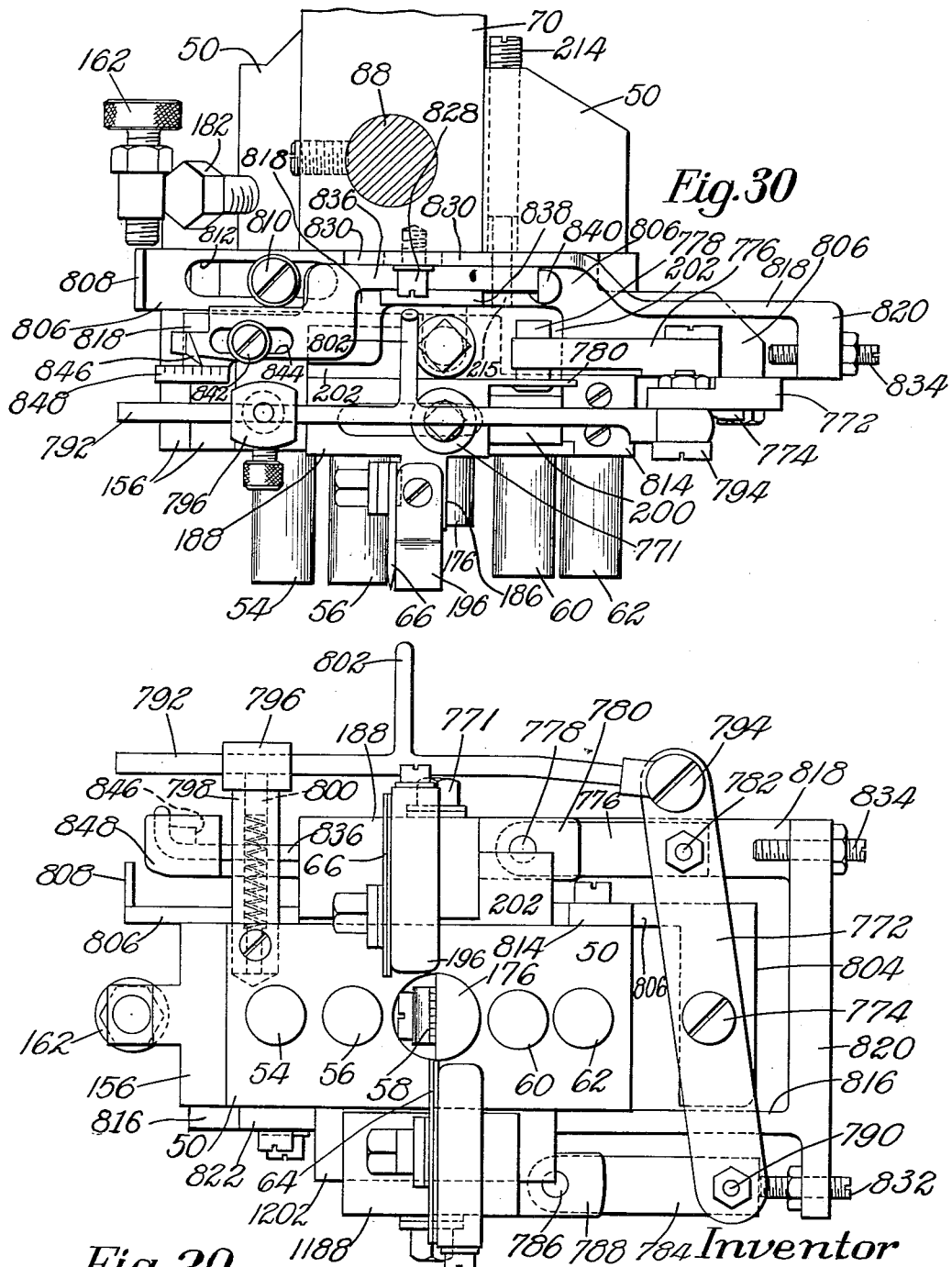

May 22, 1956  A. S. CLARK  2,746,068
INSOLE LIP CUTTING AND SCORING MACHINES
Filed Oct. 10, 1951  14 Sheets-Sheet 14

*Inventor*
*Alfred S. Clark*
*By his Attorney*
*Thomas J. Ryan.*

United States Patent Office 2,746,068
Patented May 22, 1956

2,746,068

INSOLE LIP CUTTING AND SCORING MACHINES

Alfred S. Clark, Beverly, Mass., assignor to United Shoe Machinery Corporation, Flemington, N. J., a corporation of New Jersey Application October 10, 1951, Serial No. 250,762

30 Claims. (Cl. 12—40)

This invention relates to machines for operating upon soles and is herein illustrated and described as embodied in a lip cutting and scoring machine of the type disclosed in United States Letters Patent No. 2,302,738, granted November 24, 1942, upon the application of Frederic E. Bertrand. Lip cutting and scoring machines are employed for the purpose of forming incisions upon the flesh surfaces of insoles to define the termination of the prospective channel lips and for the further purpose of impressing size and width markings and other indications upon various kinds of soles.

It is an object of the present invention to provide an improved machine of this type which is readily convertible to enable the various impressions to be applied at desired locations on the sole. A further object is to provide a machine having an improved operating mechanism which insures an even application of pressure to the various marking devices, and with improved adjustments to accommodate the various thicknesses of the work pieces.

Certain improved gaging facilities disclosed but not claimed herein, whereby a sole can be positioned in various ways in relation to the operating instrumentalities, constitute the subject matter of my copending divisional application Serial No. 434,848, filed June 7, 1954.

The several features of the invention, including details of construction and the arrangement of parts, will now be more particularly described with reference to the accompanying drawings, in which Fig. 1 is a front elevation of an illustrative machine embodying the invention;

Fig. 5a is an enlargement of a portion of Fig. 5;

Fig. 5b is an enlarged showing of the width marking die slide in its rearward guideway;

Fig. 7 is a plan view of the gaging mechanism;

Fig. 8 is a vertical sectional view taken on the line VIII—VIII of Fig. 7;

Fig. 9 is a vertical sectional view taken on the line IX—IX of Fig. 7;

Fig. 10 is a plan view of the gaging mechanism in relation to a sole;

Fig. 11 is a vertical sectional view taken on the line XI—XI of Fig. 7;

Fig. 13 is a view, partly in vertical section, taken on the line of XIII—XIII of Fig. 3;

Fig. 14 is a plan view of an optional heel gaging mechanism;

Fig. 15 is a side elevation of the gaging mechanism shown in Fig. 14;

Fig. 16 is an angular view of an optional heel gage;

Fig. 17 is a side elevation of an optional heel gage adjusting mechanism;

Fig. 18 is a front elevation of the mechanism shown in Fig. 17;

Fig. 19 is a vertical sectional view taken on the line XIX—XIX of Fig. 18;

Fig. 22 is a right side elevation of an arrangement whereby the machine is rendered self-adjusting for different thicknesses of workpieces;

Fig. 23 is a vertical section taken on the line XXIII—XXIII of Fig. 22;

Fig. 25 is a view similar to Fig. 24, with the operating parts down in work-engaging position;

Fig. 26 is a plan view of some of the parts shown in Fig. 22;

Fig. 27 is a rear elevation of some of the parts shown in Fig. 22;

Fig. 29 is a bottom plan view of an arrangement for adjusting the knives for orthopedic work;

Fig. 30 is a right side elevation of the arrangement shown in Fig. 29 as seen in its right side up position in the machine;

Fig. 32 is an enlarged sectional view of some of the parts shown in Fig. 27.

Figure 3:
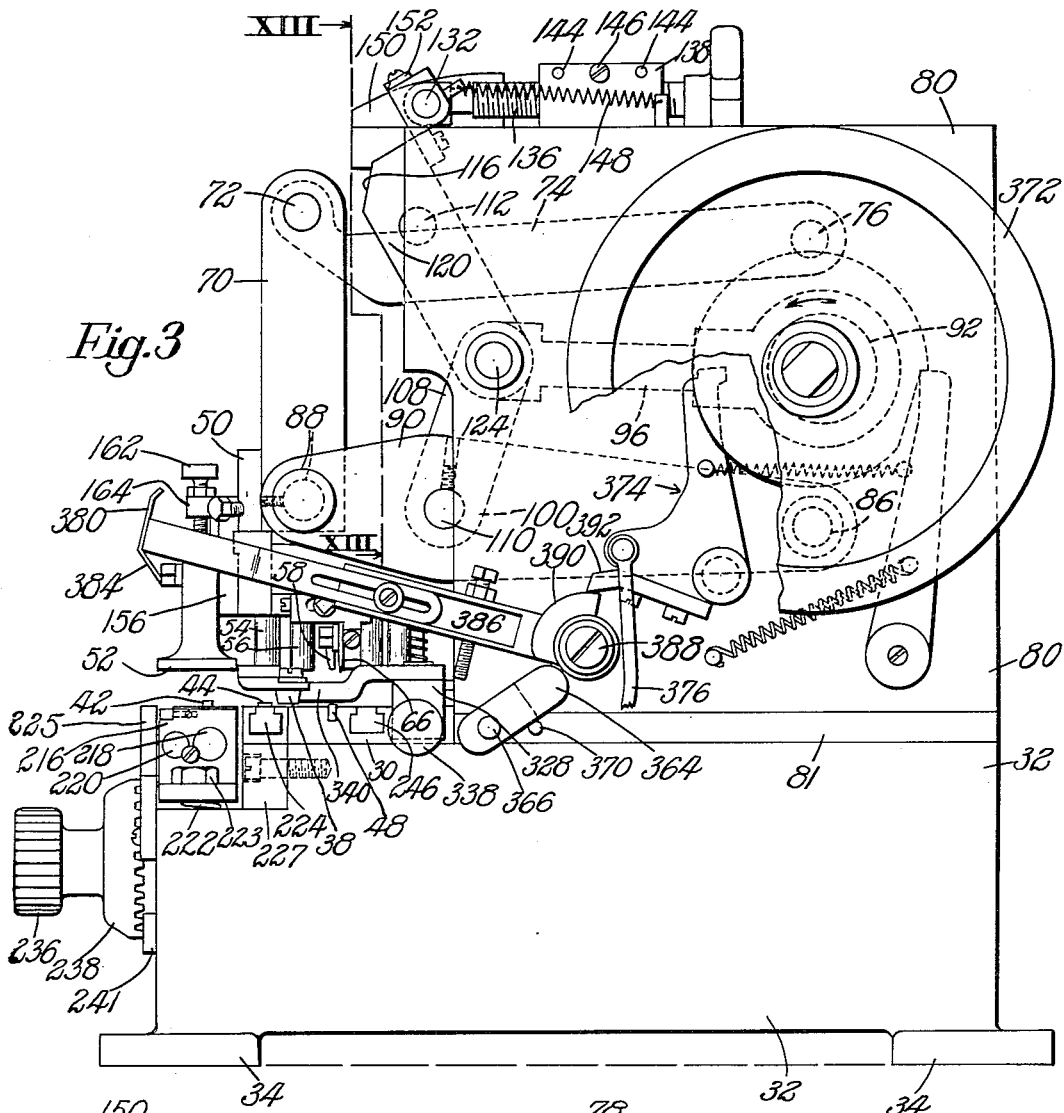
Fig. 3 is a side elevation of the machine.
Figure 5:
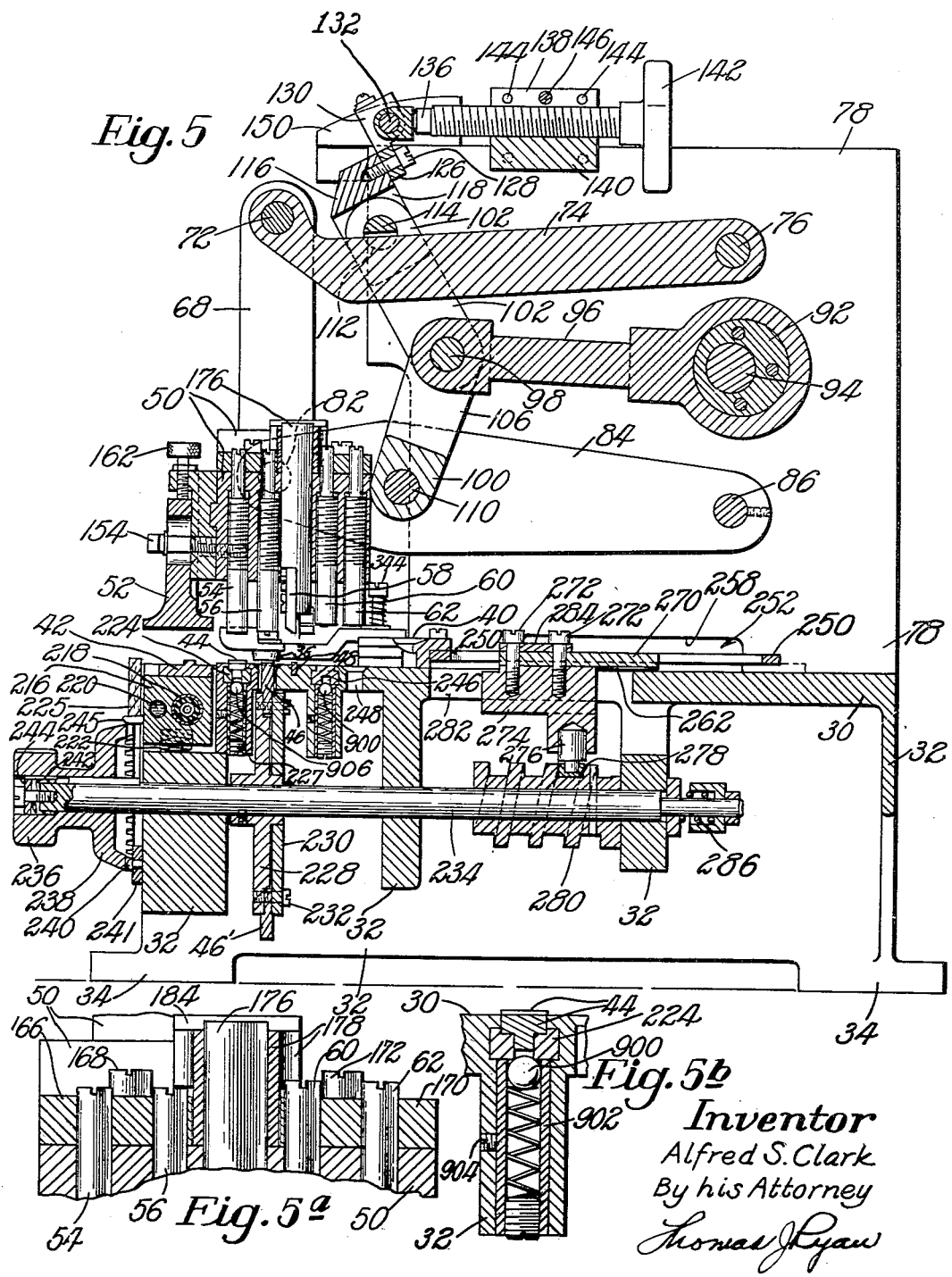
Fig. 5 is a horizontal sectional view taken on the line V—V of Fig. 1.

Referring to Figs. 3 and 5, the illustrated machine is provided with a worktable 30 which constitutes the top of a frame in the form of a box-like housing or supporting structure 32 having feet 34 adapted to rest upon a work bench. The forward portion of the worktable 30 has a sole supporting surface upon which an insole S (Fig. 10) can be centered laterally of the machine by gage rolls 36 and 38. The longitudinal position of the sole is determined by the engagement of its heel end with a gage 40. Associated with the worktable 30 are various marking or impressing devices for operating on the under or grain surface of the sole S. One of these marking devices is a die 42 for impressing the manufacturer's trade-mark or other identifying symbol upon the sole. Another die 44 stamps the width mark and still another die 46 stamps the size mark upon the sole. Also associated with the worktable 30 is a die 48 for impressing a line of indentations known as score markings upon the grain surface of the sole to mark the position of the heel breast line.

A plurality of tools in the form of presser members, carried by a vertically movable head 50 (shown best in Fig. 12), engage the upper or flesh surface of the sole S to press the sole against the various dies. These presser members, numbered 52, 54, and 56, cooperate with the dies 42, 44, and 46, respectively. A toothed indenting tool 58 carried by the head 50 cooperates with the die 48 and also forms indentations in the flesh surface of the sole to mark the breast line. Also carried by the head 50 are a pair of presser members 60 and 62 which, as will later be explained, can be used when the size-marking and width marking dies are positioned heelwardly of the breast line of the sole. Two knives, 64 and 66, (Fig. 1) are also carried by the head 50 for making incising cuts into the flesh surface of the sole to determine the heelward ends of the channel lips which are to be cut by a subsequent operation. Indenting tools may, if desired, be substituted for the knives to make score markings instead of cuts.

The head 50 (Fig. 1) consists of a block having a pair of integral upstanding arms 68 and 70, the upper end portions of which are pivotally connected by a pin 72 (see also Fig. 5) to the forward end of an arm 74. The rear end of the arm 74 is pivotally supported upon a stationary pin 76 extending across and secured in a pair of vertical walls 78 and 80 extending up from the housing 32 and having horizontal flanges 81 (Fig. 3) by which they are secured upon the housing. The lower portion of the arm 68 is pivotally connected by a pin 82 (Figs. 1 and 5) to the forward end of an arm 84 the rear end of which is pivotally supported upon a pin 86 extending across and journaled in bearings formed in the walls 78 and 80 directly below the pin 76. The arm 70 is pivotally connected by a pin 88 coaxial with the pin 82 to the forward end of an arm 90 the rear end of which is secured for pivotal movement upon the pin 86. It will be readily apparent from an inspection of Fig. 5 that the plane which includes the axes of the pins 72 and 76 is always parallel to the plane which includes the common axis of the pins 82 and 88 and the axis of the pin 86 and that, therefore, the plane which includes the axis of the pin 72 and the common axis of the pins 82 and 88 is always vertical, thereby insuring that the movement of the head 50 will take place in an up-and-down path without tilting. In other words, the four axes define a parallelogram and the assembly just described constitutes a parallel linkage, the upper link of which is the arm 74 and the lower link of which consists of the two arms 84 and 90 which move in unison and are always parallel to the arm 74.

The raising and lowering of the head 50 is accomplished by means of a toggle mechanism operated by an eccentric 92 (Fig. 5) secured upon a power driven shaft 94 under control of a clutch of a type later to be disclosed. The eccentric 92, through a connecting rod 96, drives a toggle pin 98 which pivotally connects the adjacent ends of an assembly of toggle members comprising a lower link in the form of a yoke 100 and a pair of parallel upper links 102 and 104 (Fig. 13). The yoke 100 has a pair of upstanding parallel arms 106 and 108, the lower portion of this member being pivotally mounted upon a pin 110 having end portions which are secured in the arms 84 and 90. The upper ends of the links 102 and 104 are pivotally mounted upon a pin 112 having a central portion 114 which is notched to clear the arm 74. The end portions of the pin 112 are secured in a supporting arm in the form of a yoke 116 having a pair of depending parallel branches 118 and 120. The branch 118 is secured upon a trunnion pin 122 (shown also in Fig. 1) which is journaled in a bearing formed in the wall 78. The branch 120 is secured upon a trunnion pin 124 which is journaled in a bearing formed in the wall 80. The trunnion pins 122 and 124 are coaxial and their common axis coincides with the axis of the toggle pin 98 when the eccentric rod 96 is in its most rearward position and with the head 50 raised to its highest point.

Figure 4:
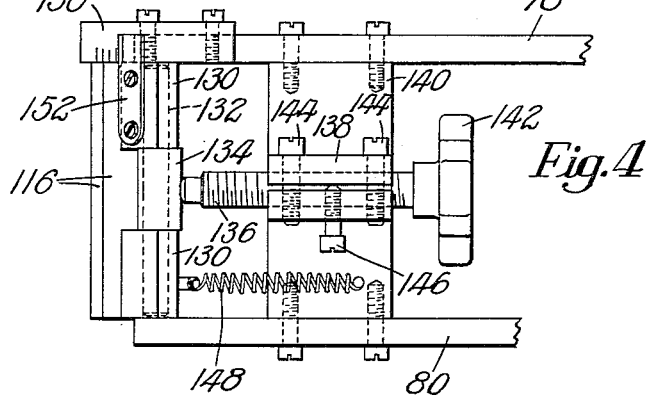
Fig. 4 is a plan view of the forward upper portion of the machine.

The pressure exerted by the various presser members and the depth to which the knives cut into the sole depend upon the height of the head 50 at the end of its downward stroke. This height can be varied by an angular adjustment of the supporting arm 116 about the common axis of the trunnion pins 122 and 124. To this end a bracket 126 (Fig. 5) is rigidly secured by screws 128 to the supporting arm 116. Extending up from the end portions of the bracket 126 are lugs 130 (see also Fig. 4) into which are secured the end portions of a cross pin 132. Rotatably mounted upon the pin 132 between the lugs 130 is a sleeve 134 having a flat abutment surface which is engaged by the end of a screw 136 threaded through a split block 138. This block is integral with a bridge 140 extending across the space between the walls 78 and 80 and secured thereto. The screw 136 can be turned by a hand wheel 142 to vary the adjustment. A pair of tightening screws 144 and an expanding screw 146 are used to draw the sections of the split block 138 together or spread them apart to insure proper frictional engagement between the threads of the screw 136 and the threads of the block 138. A tension spring 148 fastened at one end to one of the lugs 130 and anchored at its other end to the bridge 140 holds the sleeve 134 against the end of the screw 136. Because of this arrangement the pin 112, which is the stationary or thrust sustaining member of the toggle assembly, is securely held against the upward reactive thrust of the toggle links resulting from the forward thrust of the eccentric rod 96.

The operator will turn the hand wheel 142 to adjust the toggle supporting arm 116 and thereby to vary the heightwise position of the toggle pin 112 in accordance with the thickness of the work piece and the degree of pressure which he considers suitable for the work piece to be operated upon. In order to enable him to make the desired adjustment accurately, a plate 150 is secured to the forward upward portion of the wall 78, the upper edge of the plate 150 being arcuate about the common axis of the pins 122 and 124. A pointer 152 secured upon the adjacent lug 130 cooperates with scale markings upon this arcuate edge of the plate 150 to indicate the position of adjustment of the supporting arms 116 and thus to indicate the extreme downward position which will be reached by the head 50. It is evident that the toggle assembly and its adjusting mechanism, as above described, enable a particularly accurate and fine adjustment to be made of the down position of the head 50. Furthermore, the adjusting mechanism, being stationary, is not subject to the alternating stresses and resulting wear which would take place if it were to be included in the train of operating mechanism.

Figure 12:
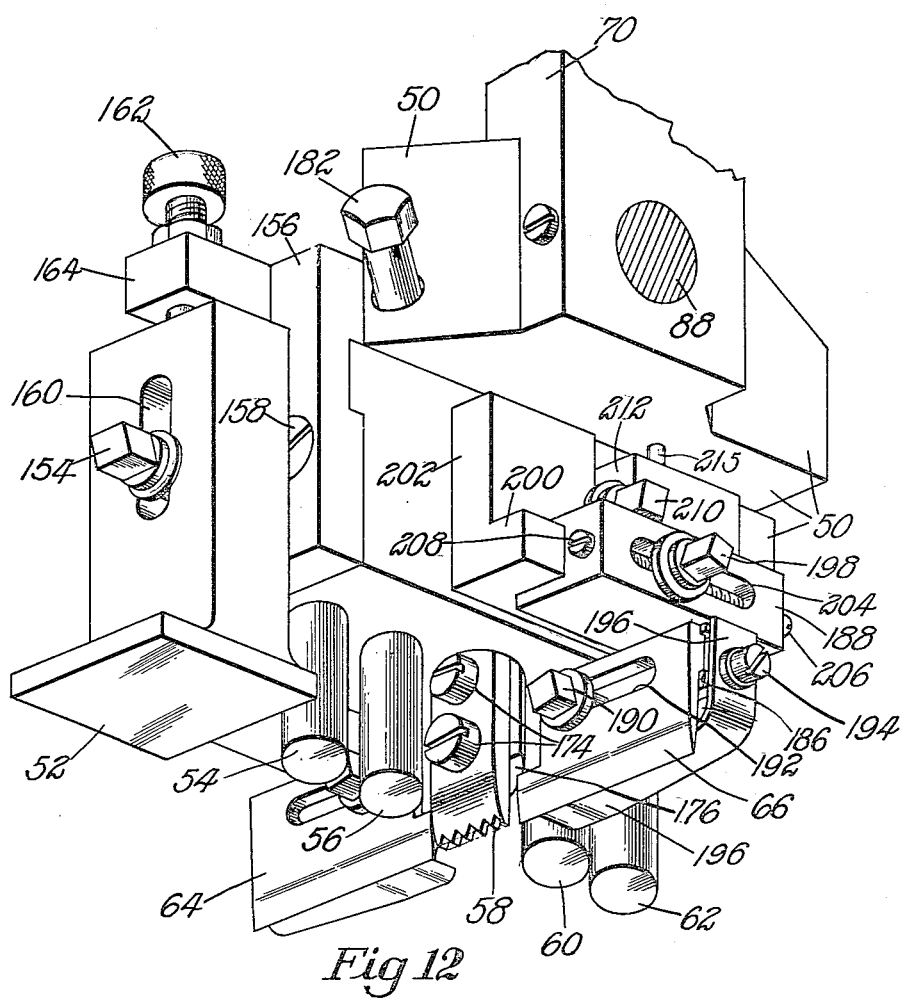
Fig. 12 is an angular view of a movable head that carries lip cutting knives and other tools.

The presser member 52, as best shown in Fig. 12, is secured by a screw 154 to a bracket 156 which is clamped by two screws 158 (one of which appears in Fig. 12) to the forward face of the head 50. A vertical slot 160 formed in the presser member 52 for the screw 154, and a vertically disposed tongue-and-groove engagement between the presser member and the bracket 156, provide for heightwise adjustment of the presser member. Such adjustment can be determined accurately by a screw 162 threaded down through a lug 164 on the bracket 156 and having its lower end engageable with the top of the presser member.

Figures 1, 2:
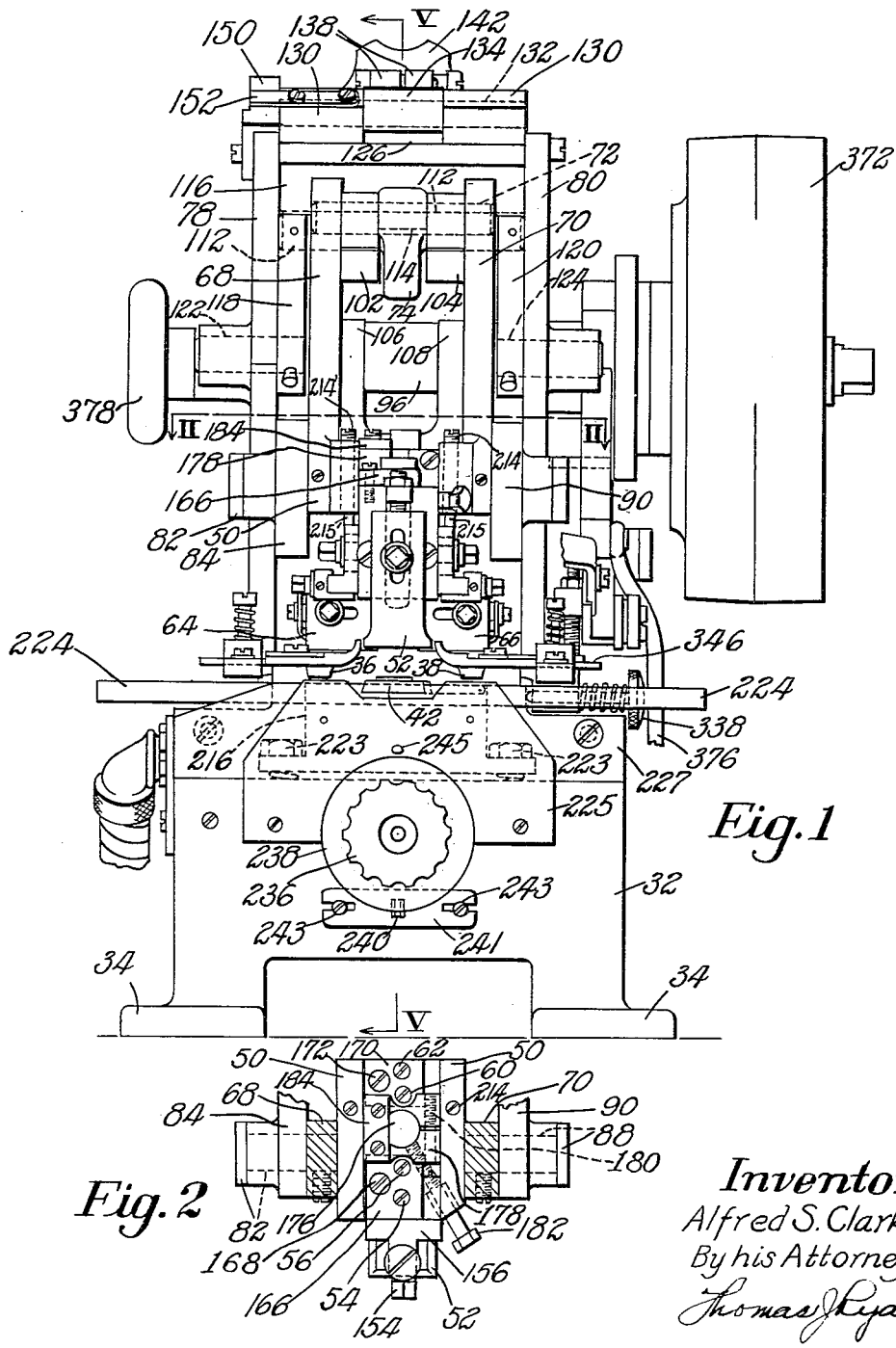
Fig. 2 is a horizontal section taken on the line II—II of Fig. 1.

The presser members 54 and 56 are cylindrical and are threaded up into counterbores formed in the head 50. They have reduced upper portions which extend above the upper surface of the head 50 and also through bores in a cramping plate 166 (Fig. 1, 2 and 5a). The right hand edge of this cramping plate rests upon the upper surface of the head 50 and serves as a fulcrum about which the plate can tilt, the lower surface of the plate being beveled to clear the upper surface of the head 50. The cramping plate 166 can be forcibly tilted down about its right hand edge by a screw 168 extending down through a clearance hole in the plate 166 and threaded into the head 50. Such tilting of the plate 166 enables it to bind or cramp the upper portions of the presser members 54 and 56 and thereby prevent their turning out of their adjusted positions. The presser members 60 and 62 are similar to the presser members 54 and 56 and are similarly mounted in the head 50 and are held in their adjusted positions by a cramping plate 170 and screw 172.

The indenting tool 58 (Fig. 12) is clamped by screws 174 to a slabbed off surface of a cylindrical rod 176 (see also Figs. 2 and 5a) extending up through a bore in the head 50. The upper edge of the indenting member 58 engages a shoulder on the rod 176. A split clamping block 178 (Figs. 1, 2 and 5a) is clamped upon the upper end portion of the rod 176 by a binding screw 180. The block 178 rests upon the upper surface of the head 50 and thus determines the position of heightwise adjustment of the indenting tool 58. The rod 176 is held against heightwise movement in its bore by a setscrew 182 threaded into the head 50 and having its end bearing against the rod. Turning of the rod 176 relatively to the block 178 is prevented by a plate 184 secured by screws to the upper face of the block 178 and having one of its edges engaging a squared off portion of the rod. Turning of the block 178 is prevented by the engagement of its lateral edges with vertical walls extending upwardly from the head 50. If indentations on the flesh surface of the sole are unnecessary, the work engaging end of the tool 58 need not be serrated but can be left plain. If it should be desired to make an ink mark upon the sole rather than a line of indentations, the ink marking tool 10, as disclosed in my copending application, Serial No. 123,075, filed October 22, 1949, now Patent No. 2,699,110, granted January 11, 1955 can be used in place of the indenting tool 58 and its associated rod 176.

Figure 31:
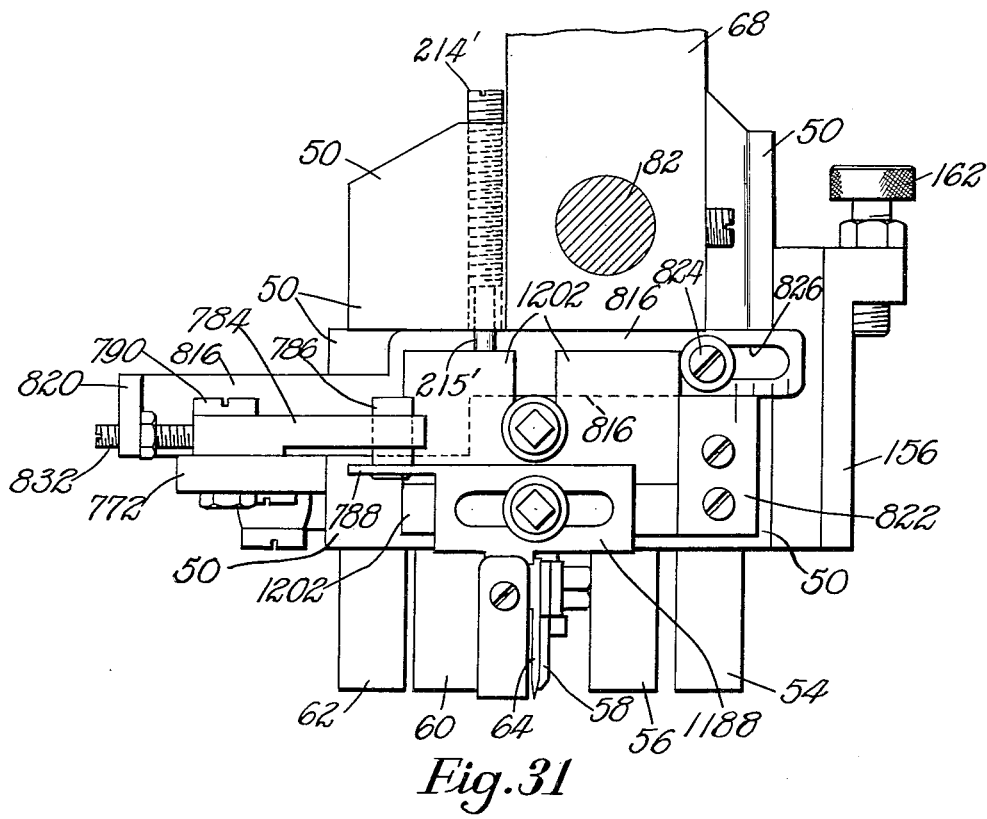
Fig. 31 is a left side elevation of the arrangement shown in Fig. 30.

The mounting and adjustment of the knives 64 and 66 are similar and, for convenience, will be described with reference to the knife 66 only, best shown in Fig. 12. The knife 66 has a transverse (with respect to the machine) tongue-and-groove engagement with a flange 186 depending from a block 188. The knife 66 is clamped to the flange 186 by a screw 190 extending through a horizontal slot 192 which is formed in the knife to permit transverse or lateral adjustment. Clamped against the outer end of the flange 186 by a screw 194 is an end portion of a leaf spring 196 which curves from a vertical to a nearly horizontal position beneath the flange 186. This spring is disposed directly behind the edge of the knife 66 and it normally extends slightly below the edge of the knife, yielding to permit the knife to cut into the surface of the work piece and then, when the knife is raised, returning to its normal position to force the work piece off the knife. A similar spring is provided for the knife 64. The block 188 is clamped by a screw 198 to a horizontal flange 200 formed on a block 202, the block 188 being grooved to embrace the flange 200 and being slidable along the flange forwardly and rearwardly of the machine for the purpose of adjustment. The screw 198 extends through a slot 204 formed in the block to permit such adjustment. A fine adjustment of the block 188 on the flange 200 can be effected by a pair of coaxial screws 206 and 208 threaded through the end portions of the block 188 and having their ends in abutting engagement with an unthreaded portion of the shank of the screw 198. The block 202 is clamped by a screw 210 to a vertical face of the head 50, with which the block has a tongue-and-groove engagement (not shown) disposed for heightwise adjustment. Such adjustment is permitted by a slot 212 formed in the block, and is determined by a screw 214 (Figs. 1 and 2) threaded down through an overhanging portion of the head 50 and having a reduced lower end portion 215 (Figs. 12 and 30). The left hand counterpart of the screw 214 is shown in Fig. 31 as 214', with a reduced lower end portion 215'.

It is evident from the foregoing description that each of the knives 64 and 66 can be adjusted independently of the other in all three directions. The heightwise adjustment and the forward and rearward adjustment are usually, although not necessarily, so made as to bring the edges of the knives into colinear relationship. The transverse adjustment permits either knife to be adjusted toward or from the other.

The manufacturer's stamping die 42 (Figs. 1, 3 and 5) is replaceably mounted upon a block 216 which is heated by an electrical heating unit 218 under control of a thermostat 220. The block 216 is supported in a recess in the forward portion of the housing 32, and out of direct contact with other portions of the machine to prevent heat dissipation into said other portions, by a pair of compression springs 222 which permit a slight yielding under the pressure of the presser member 52. A pair of screws 223 threaded down into the front wall of the housing 32 and having their shanks extending through holes in lateral flanges formed on the block 216 have heads which hold the block down against the thrust of the springs 222. The holes in said lateral flanges through which the screws 223 extend are hour-glass-shaped, that is, bell mounted at the top and bottom, to permit tilting as well as downward yielding of the block 216 and thereby to insure a uniform distribution of pressure on the work piece as the presser member 52 descends. A shield 225 of heat resistant material covers the front face of the block 216.

Each of the width marking dies 44 has a depending stem which fits into one of a plurality of holes formed in a slide 224 (Figs. 5 and 5b), which slide is movable in a guideway extending tranversely of the machine to bring a selected die into operating position. The upper portion of each die is square and it seats into a groove running lengthwise of the slide to prevent turning of the die. Fig. 5 shows the slide 224 mounted in a forward position on the machine frame for making the width mark forward of the breast line of the sole. When the width mark is to be made rearward of the breast line the slide 244 is removed and inserted into a guideway which is shown, in Fig. 5, as occupied by a blank or dummy slide 246. Fig. 5b shows the slide 224 in this rearward position. When the slide 224 has been moved transversely to bring a selected die into operating position, the slide is retained in its guideway by a spring-pressed ball detent 900, the ball of which engages the same hole of the slide as that which receives the depending stem of the operative die 44. The detent 900, comprising the ball, the spring, and a threaded retaining plug, are housed in a casing 902 which is held by a set screw 904 in a recess formed in a portion of the machine frame 32. This arrangement insures that each die will be retained in its proper operative position regardless of any inaccuracies in the spacing of the die-positioning holes in the slide 224. When the slide 224 is to be shifted to the forward position shown in Fig. 5, it is inserted into a guideway formed, not directly in the frame 32, but in a block 227 which constitutes a readily removable extension of the frame. The block 227 carries a detent 906 similar to the detent 900. When the block 227 has been removed, the heated block 216 which carries the manufacturer's stamping die 42 can be shifted rearwardly by removing the screws 223 and, after properly positioning the heated block 216, threading the screws into a set of threaded holes formed in the frame 32 rearwardly of the holes occupied by the screws when in the position shown in Fig. 3.

The size marking die 46 is one of a plurality, another of which, 46', is shown in Fig. 5. These dies are all mounted upon a wheel 228, each die having a shank which is clamped in an individual notch in the wheel. These notches are conveniently formed by making radial bore holes into the rim of a disk of excess thickness, and then milling one face of the disk to bring the disk to the required thickness of the wheel and thus convert the bore holes into notches. The shanks of the dies have flat surfaces formed on them, which surfaces, however, are not in the plane of the milled face of the disk but a little above that plane; that is, each shank extends a little outside of its notch and has a flat face to engage a clamping device. This clamping device consists of a disk 230 centered on the hub of the wheel 228 and having its marginal portion bearing against the flat faces of the shanks of the dies. Clamping pressure is obtained by screws 232 extending through the disk 230 and threaded into the wheel 228, each screw being positioned between two of the shanks of the dies. When all the screws 232 are tightened, the dies are all firmly clamped in the wheel 228; and any one die can be released for adjustment or replacement by loosening a few of the adjacent clamping screws 232. The hub of the wheel 228 is secured by a setscrew to a shaft 234 journaled in bearings formed in the housing 32.

A hand wheel 236 (Figs. 1, 3, and 5) which is slidably keyed upon the shaft 234 enables the shaft to be turned to bring any desired size marking die into operative position. The hand wheel 236 is integral with a cup-shaped flange or dial 238 having a toothed rim which engages a pin 240 carried by a plate 241 secured, by screws 243, to the front wall of the housing 32. The pin 240 prevents undesired turning of the shaft 234, and the plate 241 upon which it is mounted can be adjusted laterally of the machine to insure proper centering of the size marking die 46 when the shaft is thus held stationary. The rim of the flange 238 carries numbers corresponding to the size marking dies, and a stationary pin 245 (Fig. 5) cooperates with these numbers to indicate the particular die which is in operative position. If desired, an arrow may be used instead of the pin 245. A coil spring 242 (Fig. 5) interposed between a washer 244 secured to the shaft 234 and a shoulder formed internally on the hand wheel 236 normally holds the flange or dial 238 in locking engagement with the pin 240 from which position, however, it can readily be pulled forward out of engagement to permit readjustment.

The indenting or score marking die 48 is firmly set into a recess provided for it in the worktable 30. If, as has already been explained, it should be desired to impress the width and size marks rearwardly of the heel breast line, the width marking die slide 224 can be withdrawn from its guideway and inserted in the guideway shown in Fig. 5 as occupied by a blank or dummy slide 246. Also the wheel 228 will be secured rearwardly upon the shaft 234 in such a position that the size marking dies will extend up through an opening 248 formed in the worktable for that purpose.

The heel end gage 40 (Figs. 5, 7 and 10) is rigidly secured upon the forward end of a member 250 which constitutes a portion of a slide indicated generally by the reference numeral 252. The shape of the slide 252, as shown in Fig. 7, is in the form of the letter H of which the member 250 corresponds to the right-hand bar and a member 254 corresponds to the left-hand bar. The members 250 and 254 are integrally connected by a portion 256 which corresponds to the cross bar of the H and which extends through an opening 258 formed in the left-hand frame wall 78. The slide 252 is slidable forwardly and rearwardly of the machine upon a lower slide 260 (Fig. 7) having a portion 262 beneath the member 250 and a portion 264 beneath the member 254, and having also a connecting portion 266 beneath the member 256 and also extending through the opening 258. Formed in the member 250 is a longitudinal slot 268 into which extends a guiding key 270 formed integrally on the portion 262 of the lower slide 260. Secured to the under face of the portion 262 by screws 272 is a block 274 which carries a downwardly extending pin 276 (Fig. 5) on which is mounted a block 278. Rigidly secured to the shaft 234 is a worm 280 into the groove of which the block 278 slidably extends so that turning of the shaft will move the block 274 forwardly and rearwardly. The block 274 is guided in its forward and rearward movement by a slot 282 formed in the worktable 30 which is slidably engaged by the block. The screws 272 serve also to secure a retaining plate 284 to the upper surface of the key portion 270 of the slide member 262, the key portion being thick enough to maintain the plate 284 slightly raised for clearance above the upper surface of the member 250 to permit relative sliding movement. The shaft 234 is maintained in its rearward operating position by a compression spring 286 which is considerably stronger than the spring 242 and which holds the end surface of the worm 280 against one of the bearing lugs of the housing 32.

Secured upon the left-hand member 264 of the lower slide 260 is a key 288 which engages a slot 290 in the member 254 of the slide 252. A clamping screw 292 (Fig. 8) threaded down into the member 264 and having a winged head 294 can be tightened to clamp a washer 296 against the upper surface of the member 254 and thereby to clamp the member 254 to the member 264, that is, to clamp the two slides together so that when the lower slide is moved by the turning of the hand wheel 236 the upper slide which carries the heel end gage 40 will move in unison with it. A pointer 298 fixed upon the upper slide 252 cooperates with a stationary scale 300 secured by screws 299 to the machine frame and having suitable graduations to indicate the adjustment of the gage 40.

It is sometimes desirable to adjust the forward and rearward position of the heel end gage 40 independently of the hand wheel 236 and its associated size marking dies 46. To this end, the winged screw 292 can be loosened to free the upper slide 252 from the lower slide 260. A suitable adjustment can then be made of the upper slide manually, whereupon a normally loose winged screw 302 (see also Fig. 9) threaded down into a stationary key 304 can be tightened to clamp the upper slide in its adjusted position. This arrangement permits the use of any of the size marking dies while the heel end gage 40 is maintained in a fixed position. The key 304 is securely fixed upon a stationary block 305 secured to the housing 32. The scale 300 is secured by screws 299 to a stationary bracket 301 mounted on the housing 32. To permit a setting up adjustment of the scale 300, the holes in the scale through which the screws 299 extend are elongated.

The scale 300 (when set in its adjusted position) and the score marker 48 are both fixed in relation to the machine frame and therefore to each other, and the pointer 298 is fixed in relation to the gaging surface of the heel end gage 40. The scale reading of the pointer 298 therefore always indicates the distance between the score marker 48 and the heel end of the gaged sole S; that is, it indicates the position (or assumed position) of the breast line of the sole, inasmuch as the score marking is usually made at a locality which is considered to be the breast line. The graduations on the scale 300 may be made uniform to indicate this distance in inches or millimeters if desired.

The position of the breast line, as indicated by the score marking made by the die 48, in relation to the heel end of the sole S varies not only with the length of the sole, but may also vary as between soles of the same length but intended for application to shoes having heels of different types or styles. The proper adjustment for any one type or style of heel is made by turning the dial 238 to some particular size of sole, such as size 8, loosening the winged screw 292 (the winged screw 302 being already loose) and moving the slide 252 manually to bring the end gage 40 into whatever position is desirable for the size 8 sole intended for use with that type or style of heel. The winged screw 292 is then tightened. To obtain a proper setting of the heel gage 40 for any other size of sole intended for use with that same type or style of heel, it is only necessary to turn the dial 238 to the desired size indication.

In factories wherein only a few different types or styles of heels are used, it may be desirable to provide marks upon the scale 300 to indicate the various adjustments of relative position between the slides 252 and 260 rather than to graduate the scale in inches or other conventional units. Thus, if only three types or styles of heels are to be dealt with, only three marks on the scale will be necessary. The positions of these marks are determined by turning the dial 238 to size 8 (for example), loosening the winged screw 292, and moving the slide 252 manually into any one of the three desirable positions for the size 8 sole intended for use with the three respective types or styles of heels. The three positions of the pointer 298, as thus determined, are marked upon the scale. Once these marks have been made upon the scale, it is only necessary to bring the pointer 298 to the appropriate mark for the type or style of heel which is to be used and then to tighten the screw 292. The dial 238 can then be turned to the appropriate size of the sole to be operated upon.

An optional device for facilitating the relative adjustment between the slides 252 and 260 is shown in Figs. 17, 18 and 19. When using this device, the winged screws 292 and 302 are omitted. The device comprises a rack 600 secured on the slide 252 and meshing with a pinion 602 fixed on a shaft 604 which rotates in a bearing 606 mounted on the slide 260. Secured to the shaft 604 is the hub of a disk 608 which carries upon its outer face a coaxial hand wheel or disk 610. Formed in the hand wheel 610 are a pair of arcuate slots 612 through which extend screws 614 for clamping the hand wheel upon the disk 608. The hand wheel 610 has formed in its periphery a plurality of notches 616 which cooperate with a detent 618 to hold the hand wheel against undesired turning. The detent 618 is mounted upon one end of a spring bar 620 which is secured at its other end to an upstanding lug 622 integral with the bearing 606. Each notch 616 corresponds to one of the several types or styles of heels intended to be used. The desired positions of the notches are determined by a method similar to that outlined in the preceding paragraph. The hand wheel 610 is readily detachable and interchangeable with other hand wheels having different arrangements of notches to suit whatever requirements may be called for. The arcuate slots 612 enable an accurate setting up adjustment to be made.

The sole edge gages 36 and 38 (Figs. 7 and 10) are carried indirectly upon the forward ends of a pair of arms 306 and 308 the rear portions of which are pivoted respectively upon fulcrum pins 310 and 312 secured in the worktable 30. The arms 306 and 308 are provided with over and underlapping bell crank extensions 314 and 316 respectively. A square block 318 swiveled upon a pin 320 secured upon the extension 316 engages a slot 322 formed in the extension 314 and thereby coordinates the movements of the arms 306 and 308 and also of the gages 36 and 38 about a common center line directed forwardly and rearwardly of the machine. A tension spring 324 having its ends secured to the arms 306 and 308 urges the arms toward each other to a limiting position determined by a stop in the form of a screw 326 (see also Fig. 11) threaded through a block 328 secured to and depending from an outwardly extending end portion 330 of the arm 308. The block 328 just clears a shelf 332 (Figs. 7 and 11) formed on the housing 32 and the end of the screw 326 bears against a vertical wall or shoulder 334 formed on the housing 32. A compression spring 336 surrounding the shank of the screw 326 and interposed between the block 328 and a knurled head 338 formed on the screw holds the screw against undesired turning.

Seated in a groove formed in the outwardly turned portion 330 of the arm 308 is a bracket 340 extending forwardly, that is, in the general direction of the arm 308. A compression spring 342, surrounding a screw 344 which extends through a clearance hole in the bracket 340 and is threaded down through the portion 330 and into the block 328, yieldingly holds the bracket in its groove. Seated in a transverse groove in the forward end of the bracket 340 is a transverse bracket 346 adjustably clamped by a screw 348 extending through a slot 350 formed in the bracket 346 to permit adjustment transversely of the machine. The gage roll 38 is mounted for idle rotation upon a pin 358 depending from the bracket 346. A second bracket 352 in telescoping relation to the bracket 346 and adjustably secured thereto by a screw 354 extending through a slot 356 carries a guide 360 which overlies the sole S and facilitates the entry of the sole S between the gage rolls. Similar arrangements for mounting the gage roll 36 are carried by the arm 306 with the exception, however, that no stop screw corresponding to the screw 326 is necessary and provision of such a screw has been omitted. Associated with the gage roll 36 is a guide 362 similar to the guide 360.

When the use of the gage roll 38 is not desired, its supporting bracket 340 is turned ninety degrees outwardly about the screw 344, and the gage roll 36 can likewise be moved to an out-of-the-way position, as shown in broken lines in Fig. 7. It is sometimes convenient to use only the gage roll 38 and to feed the soles S against it from the left, with the gage roll 36 in out-of-the-way position. In that case the gage roll 38 is preferably held in a position of fixed adjustment by a latch 364 (Figs. 3, 7 and 11) pivoted upon a pin 366 secured in the flange 81, the latch 364 having an inclined surface 368 which enters into camming engagement with a rounded face of the screw head 338 to hold the screw 326 against the wall 334 and thereby prevent movement of the gage roll. When in its out-of-the-way position, the latch 364 rests against a pin 370 secured in the flange 81. If desired, the gage roll 36 can be brought into operative position and the gage roll 38 moved into out-of-the-way position, and the soles S can then be fed from the right against the gage roll 36 which is also held in adjusted position by the same latch 364. When both gage rolls 36 and 38 are to be used as coordinated centering gages, the latch 364 is moved to its out-of-the-way position.

Figure 6:
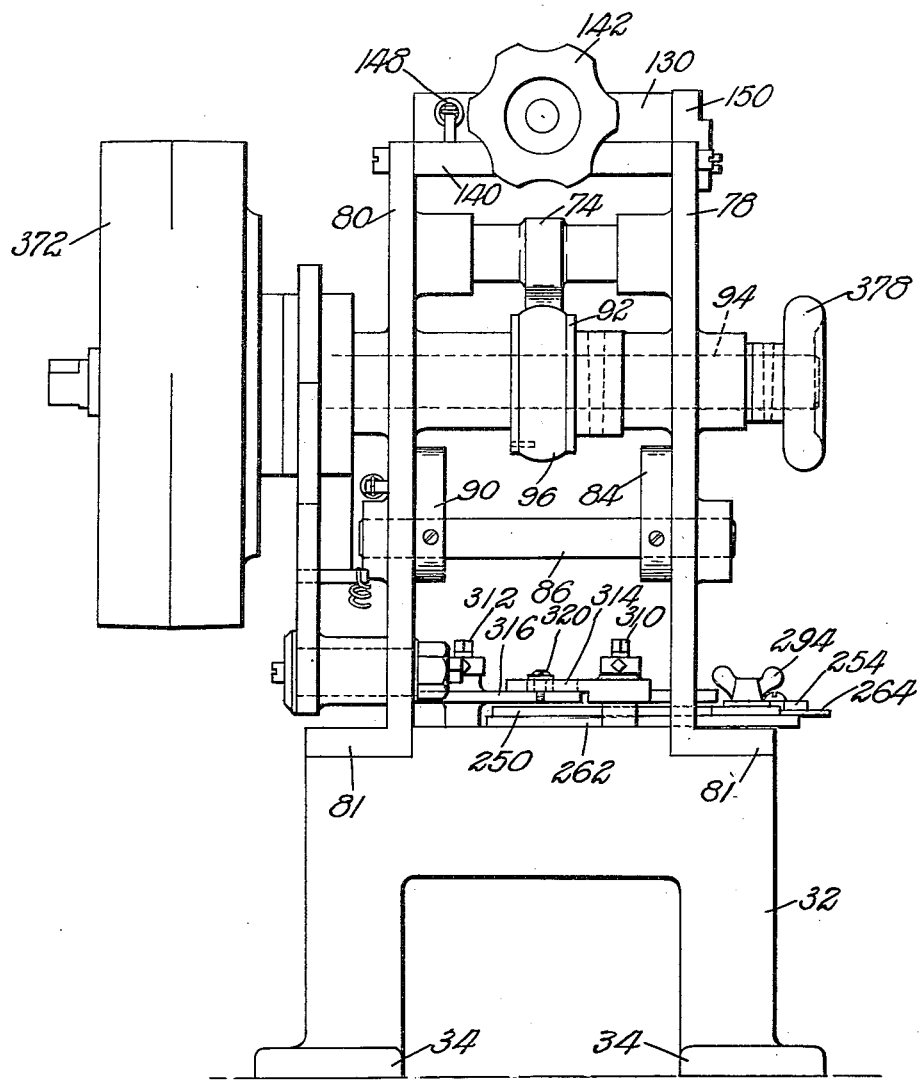
Fig. 6 is a rear elevation of the machine.

The machine is driven by any suitable source of power, transmitted through a pulley 372 (Figs. 1 and 3) and a clutch to the shaft 94. This clutch (which is of a type later to be described) is controlled by mechanism 374 and is tripped by a treadle (not shown) at the lower end of a rod 376. The shaft 94 can be turned by a hand wheel 378 (Figs. 1 and 6) to enable the operator to test the adjustment of the down position of the head 50 and the heightwise adjustments of the work-engaging instrumentalities carried thereby.

A guard 380, shown in its up or out-of-the-way position in Fig. 3, can be lowered to protect the operator's fingers. It has a sloping wall 384 which, when the guard is down, facilitates the introduction of work pieces. The guard 380 is mounted upon the forward end of an extensible arm 386 pivotally mounted for heightwise movement upon a pin 388 secured in the wall 80; the arm 386 can be shortened or lengthened to adapt the guard to the absence of the presser member 52 when the latter is not needed or when other appliances are substituted. A sector 390 on the hub of the arm 386 engages a latch 392 on a member of the clutch mechanism 374 to prevent depression of the treadle when the guard is up. Lowering of the guard into operative position moves the sector 390 out from under the latch 392 and permits tripping of the clutch.

The operation of the machine as so far described and the manner of making the various adjustments will readily be understood from a reading of the foregoing description and any further explanation thereof will be omitted. The following additional features, however, may be included in the machine.

It is sometimes desirable to provide a centering gage for the heel portion of the insole S and such a gage is shown in Figs. 14 and 15. This heel centering gage comprises a block 394 which is secured by screws 396 upon the forward end of the slide member 250 in place of the heel end gage 40. The block 394 has a depending flange 398 which just clears (or slides upon) the worktable 30 and which serves as a heel end gage for the insole. A pair of forwardly extending arms 400 and 402 are pivoted upon the smooth shank portions of screws 404 and 406 respectively, these screws being threaded into the block 394. The arm 400 at its forward end carries a depending gage pin 408 and the arm 402 at its forward end carries a similar gage pin 410. An outer segment of each gage pin 408 and 410 is slabbed off to enable the pins to clear the arms 306 and 308, leaving flat surfaces 412 on the pins. The arm 400 has a bell crank extension 414 which underlaps a bell crank extension 416 on the arm 402 and which also carries a pin 418 having pivotally mounted thereon a rectangular block 420. The extension 416, which overlaps the extension 414, has a slot 422 which the block 420 slidingly engages to coordinate the movements of the gage pins 408 and 410 with respect to a common center line. A tension spring 424 having its ends secured to the respective arms 400 and 402 tends to draw the arms together to a stopped position determined by the engagement of the arm 402 with a pin 426 secured in the block 394. A flange 427 extends forwardly and upwardly from the flange 398 to guide work pieces to the gaging face of the flange 398.

An alternative gage for the heel end of the insole is shown in Fig. 16. It consists of a blade-like member 428 having an integral shank 430 in the end portion of which is secured a depending pivot pin 432. A socket formed in a bracket 434 secured to the housing 32 supports the pin 432 to enable the gage member 428 to be swung from operative position (as shown in full lines in Fig. 16) to an out-of-the-way position (as shown in broken lines in Fig. 16). A setscrew 436 engageable with recesses in the pin 432 holds the gage member 428 in either of said positions. The front face of the gage member 428 is vertical and the lower edge of this member just clears the surface of the worktable 30. When in its operative position, the gage member 428 is just to the rear of the presser member 56 and it gages the sole with reference to the size and width marking dies 46 and 44 respectively. This gage is intended to be used mostly for soles which are to be incorporated in welt shoes having sewed heel seats or in cement process shoes. No lip cuts or breast line scoring marks are made on such soles, and the size and width marks are placed well toward the heel end of the sole. The knives 64 and 66 are inoperative when the sole is gaged in this way because the gage 24 prevents the sole from being pushed far enough back to be engaged by them. The presser 52, together with the manufacturer's marking die 42 and the heated block 216 are not used at this time; and an inclined work guide 438 may be secured to the front wall of the housing 32 in place of the heat shield 225. This inclined guide 438 cooperates with the sloping wall 384 (see Fig. 3) of the guard 380 to funnel work pieces into the machine.

Figure 21:
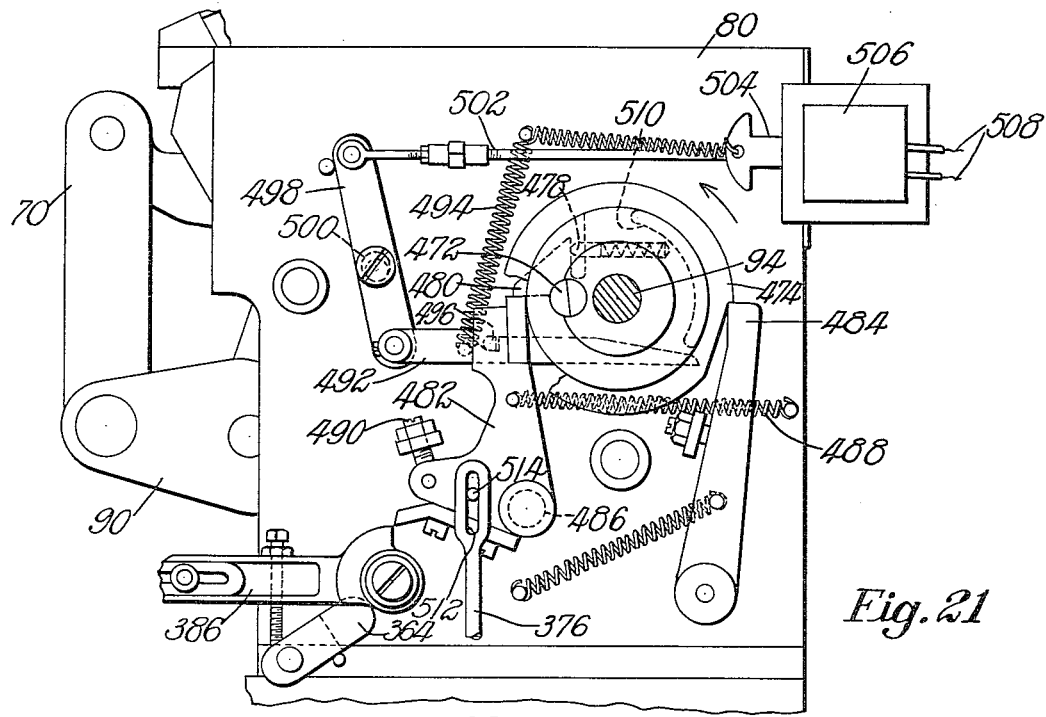
Fig. 21 is a side elevation of a clutch mechanism which is operated by the starting means shown in Fig. 20.
Figure 20:
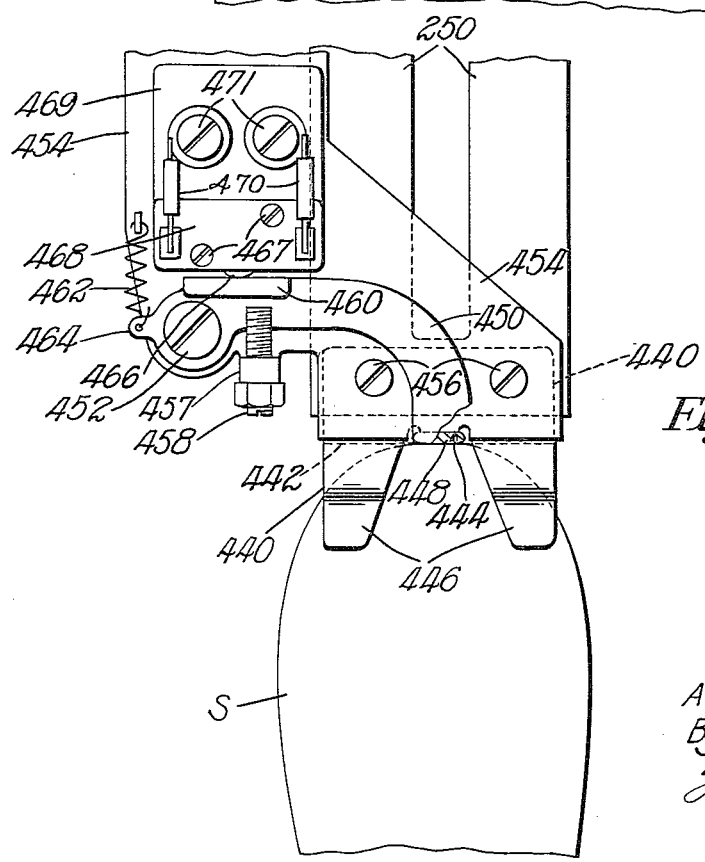
Fig. 20 is a plan view of a heel gage having means for starting the machine automatically by engagement with a work piece.
Figure 28:
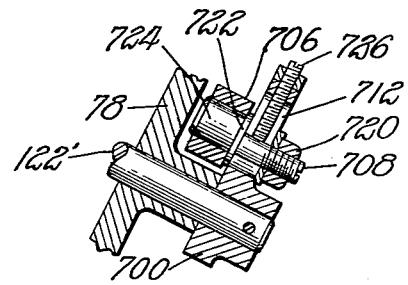
Fig. 28 is a section taken on the line XXVIII—XXVIII of Fig. 24.
Figure 24:
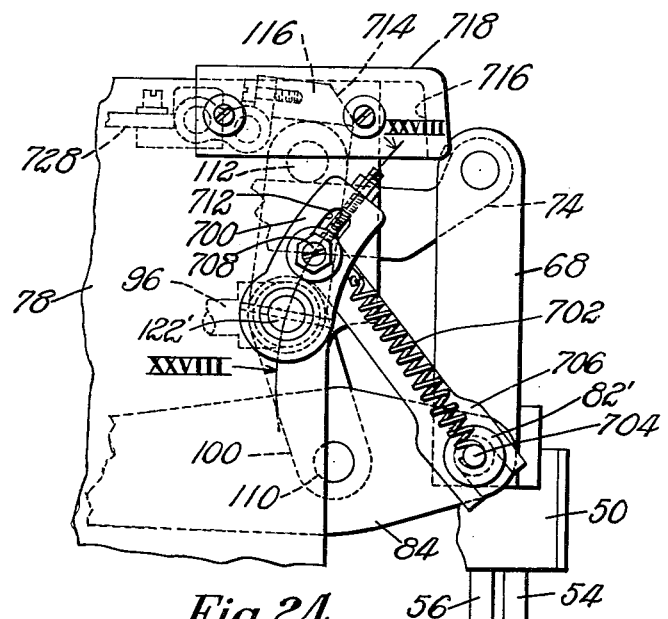
Fig. 24 is a left side elevation of some of the parts shown in Fig. 22, with the operating parts in raised position.

An arrangement whereby the machine is started automatically by the gaging of the heel end of the sole S, and then stopped at the completion of its cycle, is shown in Figs. 20 and 21. Referring to Fig. 20, it will be seen that a heel end gage 440 is secured upon the forward end of the member 250 in place of the gage 40. The gage 440 has a vertical gaging surface 442 in which is formed, midway between its ends, a notch 444. On opposite sides of the notch 444 and integral with the gage 440 are a pair of overhanging work guides 446. Movable forwardly and rearwardly in the notch 444 is an upright finger 448 secured at its upper end to, and depending from, an arm 450 fulcrumed upon a stud 452 on a bracket 454. Rearward movement of the finger 448 is limited by the engagement of the finger with the base of the notch 444, the forward face of the finger being then flush with the gaging surface 442. A pair of screws 456 serve to secure the bracket 454 to the gage 440 and also to secure the gage to the member 250. Adjustably threaded through an upstanding lug 457 on the bracket 454 is a stop screw 458 engageable with an upstanding lug 460 on the arm 450 to determine the forward position of the finger 448, in which position the finger is normally held by a tension spring 462 stretched between an ear 464 on the arm 450 and an anchorage on the bracket 454. The lug 460 is engageable with a button 466 of a switch housed in a casing 468, which button operates, when moved rearwardly, to complete a circuit through a pair of electrical leads 470. The switch casing 468 is secured by screws 467 to a plate 469, and the plate 469 is secured by screws 471 to the bracket 454. The screws 471 extend through enlarged holes in the plate 469 to permit fore and aft as well as lateral adjustment of the switch. The screw 458 is adjusted to maintain the finger 448 not quite within the notch 444 but extending out therefrom a slight distance forward of the plane of the gaging surface 442, and the plate 469 should be so adjusted on the bracket 454 as to insure closing of the circuit through the leads 470 when the finger 448 has been pushed back substantially flush with the gaging surface 442. The pressure of the sole S on the finger 448 thus closes the circuit as soon as the sole is properly gaged. In operations which do not require accuracy of centering, the centering gages 36 and 38 can be moved to their out-of-the-way positions and a relatively wide finger 448 can be employed to insure a sufficiently accurate centering before the clutch is tripped. If accurate centering is required, a narrow finger 448 or a pin can be used in a recess narrow enough to be substantially bridged as the sole engages the surface 442.

The clutch control mechanism shown in Fig. 21 is operated electrically by the device described in the preceding paragraph. The clutch itself is of the rolling pin type and is in some respects similar to that shown in Fig. 16 of United States Letters Patent No. 2,257,132, granted September 30, 1941 upon the application of August R. Schoenky. The clutch illustrated herein transmits rotation, when engaged, from the pulley 372 (Figs. 1 and 3) to the shaft 94 (Fig. 5) in the direction indicated by the arrow. The coupling element consists of a pin 472 parallel to the axis of the shaft 94 and rotatably mounted in a disk 474 keyed on the shaft. The pin 472 has a half-round extension which, when the pin is turned to engaging position, enters part way into any one of a plurality of half-round recesses formed in the inner cylindrical wall of a ring carried by the pulley 372 and so couples the shaft 94 to the pulley. A spring pressed plunger 478, housed in the disk 474, presses against an abutment face formed on a head 480 of the pin 472 to turn the pin to engaging position. Another abutment face on the head 480 is normally engaged by a stopping lever 482 to hold the pin 472 in disengaging position while, at the same time, a spring actuated pawl 484 engages a notch in the periphery of the disk 474 to hold the disk against retrograde rotation which might result from the reactive thrust of the spring pressed plunger 478. The stopping lever 482 is fulcrumed upon a stationary pin 486 extending from the side wall 80 of the machine frame, and is urged to normal or stopping position by a spring 488, which position is adjustably determined by a stop screw 490.

Engagement of the clutch is effected by withdrawing the stopping lever 482 from the abutment face of the head 480. This is done by a latch 492 held up by a spring 494 and having a notch which engages a pin 496 on the lever 482. The latch 492 is pivotally connected to the lower end of a lever 498 fulcrumed upon an eccentric pin 500 (which may be turned for purpose of adjustment) extending from the frame wall 80. The upper end of the lever 498 is pivotally connected to one end of a rod 502, the other end of which is pivotally connected to an armature 504 of a solenoid 506. This solenoid 506 is energized by current flowing through a pair of leads 508 when the circuit comprising the leads 470 is closed by the engagement of the heel end of the sole S with the pin 448. When thus energized, the solenoid 506 retracts the armature 504 and thus, through the lever 498 and the latch 492, effects engagement of the clutch to start rotation of the shaft 94. After engagement of the clutch has taken place, an arcuate abutment 510 on the disk 474 engages the latch 492 and depresses it to release the pin 496 from the latch. Even if the operator, after the head 50 has descended, should delay withdrawing the sole S from its gaged position in contact with the pin 448, leaving the solenoid 504 still energized, the lever 482 will be free to resume its stopping position and the head 480 will strike the lever 482 and turn the pin 472 into clutch-disengaging position.

The treadle mechanism already referred to may be retained as an alternative to the above-described automatic control of the clutch by the gaging of the sole, and if it is so retained, the treadle rod 376 should be provided with a lost motion slot 512 to enable a cooperating pin 514 on the lever 482 to move up and down without disturbing the treadle when the clutch is operated electrically. The treadle (not shown) is normally held by a spring up against a stop in such a position as normally to maintain the upper end of the slot 512 above the pin 514. The operation of the automatic control will therefore not affect the treadle.

In the machine as so far described, the extent to which the head 50 descends, that is, the downward limit of its movement, is determined by a manual adjustment effected through the hand wheel 142. The operator can change this adjustment for different thicknesses of work to be operated upon; for relatively thin work pieces he can adjust the toggle supporting yoke 116 forward to enable the head 50 to descend to a low position and for thicker work pieces he can adjust the toggle supporting yoke backward.

The machine can be rendered self-adjusting for different thicknesses of work by a mechanism which takes the place of the hand wheel 142, the arcuate scale plate 150, and their associated parts. This mechanism, as shown in Figs. 22 to 28 inclusive, comprises a crank arm 700 (Figs. 22, 24 and 25) pinned upon an end portion of a trunnion pin 122′ which is like the trunnion pin 122, but extended to make room for the crank arm. The toggle supporting yoke 116 (which also is fixed upon the trunnion pin 122′) is thus rigidly secured to and turns as a unit with the crank arm 700 and the trunnion pins 122′ and 124 about the axis of the trunnion pins. A tension spring 702 is hooked at its upper end to the crank arm 700 and at its lower end to a reduced extension 704 of a pin 82′ (similar to the pin 82). Now when the connecting rod 96 is in its most rearward position, the toggle pin 98 is coaxial with the trunnions 122′ and 124; and when the connecting rod begins its forward movement, the lower toggle member 100 will begin to straighten and the head 50 will begin to descend; and, as the head descends, the spring 702 will exert a turning moment upon the crank arm 700 which swings the toggle supporting yoke 116 forward and downward about the axis of the trunnions 122′ and 124. A spacing link 706 pivoted at its upper end to a pin 708 on the crank arm 700 and having at its lower end a slot 710 engaging the pin 82′ controls the position of the toggle supporting yoke 116, and therefore of the toggle thrust sustaining pin 112, in relation to the head 50, during this portion of the downward movement of the head since, during this movement, the spring 702 keeps urging the link 706 down and holds the end of the slot 710 against the pin 82′. The head 50 will thus continue to descend idly until the presser members on the head engage the work piece, whereupon the reaction of the work piece will develop an upward thrust through the presser members which, if unopposed, would stop the downward movement of the head and at the same time cause the pin 112 to rise as the toggle straightens. Such upward thrust, however, is opposed by a roll lock mechanism later to be described which permits only forward and downward swinging movement of the toggle supporting yoke 116 and which, therefore, holds the toggle thrust sustaining pin 112 against upward movement when the presser members come into contact with the work piece. As the connecting rod 96 completes its forward movement to straighten the toggle, the head 50 is forced down with positive pressure, and the presser members on the head exert this positive pressure on the work piece to cause the dies to make their impressions. At the same time the knives 64 and 66 continue to descend with the head 50 and to cut into the surface of the work piece. The spring 702 yields during this final and operative portion of the downward movement of the head 50, and the pin 82′ rides idly down the slot 710.

The self-adjusting feature just described is suited particularly to the nature of the material to be operated upon, for the insole S, whether of leather or other material, is compressible and a thick insole will yield further than a thin insole when forced by the same pressure against the stamping dies. Hence, in order to force a thick work piece with requisite pressure against the stamping dies, the head 50 with its presser members 52, 54, and 56 (or whatever presser members may be used) should descend further after engaging the thick work piece than would be necessary if the work piece were thin (although, as will be understood, the total depth to which the head descends must be less for the thick work piece). This requirement is taken care of by the fact that, as the connecting rod 96 advances, at first idly (i. e. without effect upon the work) until the presser members engage the work piece and then effectively to squeeze the work piece, the presser members will engage a thick work piece sooner than a thin work piece and render a greater portion of the travel of the connecting rod effective. That is, a greater portion of the travel of the connecting rod will be expended effectively to lower the presser members after contact of the presser members with a thick work piece than with a thin work piece, although the total depth to which the presser members descend will be less than for a thin work piece because the toggle thrust sustaining pin 112 has been stopped earlier in its forward and downward movement of self-adjustment. Also, the depth to which the knives 64 and 66 descend below the level of the surface of the work piece will be greater for a thick work piece than for a thin work piece, a result which is ordinarily desirable in operations of this character.

The extent of the effective down stroke of the head 50 (i. e., that portion of the stroke which takes place after the presser members have engaged the work piece) can be varied by an adjustment of the pin 708 toward or from the common axis of the trunnions 122′ and 124. To this end an arcuate slot 712 (Figs. 24 and 28) is so formed in the crank arm 700 as to be coaxial with the pin 82′ when the head 50 occupies the lowest position which it can reach, which position is determined by the engagement of a face 714 on the toggle supporting yoke 116 with an internal face 716 formed on a stop 718 secured to the side wall 78. The pin 708 extends through the slot 712 and is clamped in adjusted position along the slot by a nut 720 threaded on the pin and cooperating with a collar 722 integral with the pin. An eccentric 724 (the purpose of which will be explained later) on the pin 708 serves as the actual pivotal connection between the crank arm 700 and the control link 706. Now when the pin 708 is adjusted further away from the axis of the trunnion 122′, the crank arm 700 and therefore the toggle supporting yoke 116 will, when the connecting rod 96 begins its forward stroke, occupy a lower and more advanced position than they will when the pin 708 is adjusted closer to the axis of the trunnion. That this is so will become readily apparent from an inspection of Fig. 24 which shows the head 50 in raised position; if now we adjust the pin 708 outwardly in the slot 712, the spring 702 will pull the crank arm 700 forward and down as the control link 706 swings clockwise about the pin extension 704. With such an adjustment of the pin 708, the presser members 54 and 56 will contact the work and begin their effective downward travel sooner than when the pin 708 is adjusted closer to the trunnion 122'. As the head 50 descends, the slot 712 becomes more nearly coaxial with the pin 82', and when the head descends far enough for the presser members to engage a relatively thin work piece, the increase in their effective downward travel resulting from outward adjustment of the pin 708 will be less than when the head descends only far enough for the presser members to engage a thicker work piece, and the increase in pressure exerted upon the thin work piece and the increase in depth to which the knives will cut into the thin work piece will be less than the increase for a thicker work piece. This ability of the adjusting mechanism to adapt itself automatically to the requirements of the work piece, whether thick or thin, is one of the desirable features of the machine.

Although, as has already been pointed out, it is usually preferable to regulate the extent of the effective down stroke of the head 50 in accordance with the thickness of the work piece, nevertheless some conditions may render it desirable to modify the effective down stroke by an increment or decrement which is substantially constant for all thicknesses of work. Such modification can be obtained by an adjustment of the eccentric 724 to increase or diminish the effective length of the control link 706. This adjustment is carried out by loosening the nut 720 and turning the pin 708 to obtain the desired effective length of the control link 706. Before tightening the nut 720 to secure the adjustment, the previous adjustment of the pin 708 along the slot 712 can be retained, or restored if lost, by forcing the pin against the end of a tangent screw 726 threaded through the end of the crank arm 700 and extending into the slot 712. With a neutral adjustment of the eccentric 724 (the axis of the eccentric passing through the arc defining the middle of the slot 712) the magnitude of the effective down stroke of the head 50 will depend only upon the adjustment of the pin 708 in the slot 712. When, however, it is desired to superpose a substantially constant increment upon the effective down stroke of the head 50, the eccentric 724 is turned to decrease the effective length of the control link 706, and the presser members will then engage the work sooner and the effective down stroke of the head 50 will be greater than before, with an increment which is approximately uniform for all thicknesses of work. The magnitude of this increment will depend upon the extent of adjustment of the eccentric 724. Likewise, when the eccentric 724 is turned to increase the effective length of the control link 706, the presser members will engage the work later and the effective down stroke of the head will be less than before, the decrement being approximately uniform for all thicknesses of work and dependent in magnitude upon the extent of the adjustment. Thus, by suitable adjustments of the pin 708 along the slot 712 and of the eccentric 724, the machine can be made automatically adaptable to operation upon insoles of all thicknesses and in accordance with all requirements of pressure and depth of cut likely to be encountered in shoe factory practice.

The roll lock mechanism above referred to, as shown in Figs. 22 and 23, comprises a slide 728 which moves forwardly and rearwardly in a guideway formed in a bracket 730 secured to the side walls 78 and 80 and bridging the space between them. Rigidly secured to the forward end portion of the slide 728 is a bracket 732 (see also Fig. 26). A link 734 is pivotally mounted at one end upon a pin 736 carried by spaced ears on the bracket 732 and at its other end upon a pin 738 carried by spaced ears on a bracket 740 secured to the toggle supporting yoke 116. The slide 728 thus moves forwardly and rearwardly as the toggle supporting yoke 116 swings about the axis of its trunnions 122' and 124. A hardened steel clutch roll 742, unsecured to anything, extends across the upper face of the slide 728 and beneath a hardened wedging plate 743 which is fixed in a bracket 744 secured upon the bracket 730. The plate 743 slopes downwardly and rearwardly to wedge the roll 742 down into clutching engagement with the slide 728 to prevent rearward or retrograde movement of the slide while at all times permitting forward movement of the slide. The clutch roll 742 is yieldingly urged rearwardly into clutching position by a pair of hollow plungers 746 housed in bores formed in the bracket 744 and urged rearwardly by compression springs contained within the plungers and adjustably backed by screws 750 threaded through the forward wall of the bracket 744. The roll 742 is normally held out of clutching position by a broad finger 752 formed on the lower end of a lever 754 and extending forwardly into the space between the wedging plate 743 and the slide 728. The lever 754 is fulcrumed upon a transverse pin 756 mounted in spaced lateral portions of the bracket 744. The upper end of the lever 754 is pivotally connected by a pin 758 to the forward end of a link 760 (see also Figs. 26 and 27), the rear end of which link is pivotally connected by a shouldered eccentric stud 762 to the upper end of a lever 764 having a hub 765 (Fig. 27) whereby the lever is fulcrumed at its lower end upon the pin 86. The eccentric stud 762 can be turned to vary the effective length of the link 760 to insure proper adjustment of the finger 752. A roll 766 idly rotatable on a pin carried by the lever 764 engages the periphery of a cam 768 secured upon the drive shaft 94, the roll being held against the cam by a spring 770 secured at one end to the lever 764 and at its other end to the bracket 744. As shown in Figs. 22 and 32, the cam 768 is secured to the shaft 94 by three screws 769 extending through peripheral slots in the hub of the cam and threaded into holes in the hub of the eccentric 92, the eccentric being pinned upon the shaft. The three peripheral slots permit a setting up adjustment for the timing of the cam. The spring 770 tends to urge the finger 752 rearwardly away from the clutch roll 742 to permit the spring plungers 746 to lock the clutch roll against the slide 728; the cam 768, however, is designed to hold the finger positively forward to maintain the clutch roll out of operative position during the return stroke of the connecting rod 96 and the beginning of the forward stroke. Before the connecting rod 96 reaches the effective portion of its forward stroke, the cam 768 releases the clutch roll 742 and permits it to come into operative position. The connecting rod 96, in its forward stroke, causes the slide 728 to move forward in a manner that has already been explained and this forward movement of the slide continues, unopposed by the operative clutch roll 742, until the presser members on the head 50 engage the work. The clutch roll 742 then functions instantly and without lost motion to lock the slide 728 against backward movement which otherwise would result from the upward thrust of the straightening toggle comprising the yoke 100 and the links 102 and 104. The toggle sustaining pin 112 is thus positively supported in its position of self adjustment and, as the connecting rod completes its forward stroke, the head 50 completes its downward movement and causes the work engaging members to perform their operations. The clutch roll 742 is moved into unlocking position as soon as the connecting rod 96 completes its forward stroke, and the slide 728 moves back to its initial position during the return stroke of the connecting rod.

In operating upon orthopedic insoles it is desirable to position one of the knives 64 or 66 (according to whether the sole is a right or a left) in advance of the other rather than to adjust the knives with their cutting edges collinear as in standard work. An arrangement providing for ready adjustment of the knives for either standard or orthopedic work, and for ready reversal of the offset relation of the right and left knives when adjusted for orthopedic work, will now be described. Referring to Figs. 29, 30 and 31, it will be seen that the right-hand knife 66 is secured, with provision for adjustment transversely of the sole, upon the depending flange 186 of the block 188. The spring 196 is also secured upon said flange, and the block 188 is grooved to engage the flange 200 of the block 202, the flange 200 serving as a guideway along which the block 188 is slidable forwardly and rearwardly. The lock 202 is secured, with provision for heightwise adjustment, on the head 50. The construction, as so far described, is similar to that previously described for standard work; but it should be noted that for orthopedic work the block 188 is not clamped in adjusted position on the block 202 but is left free to slide under the head of a retaining shoulder screw 771 which takes the place of the clamping screw 198.

The left-hand knife 64, with its associated spring (similar to the spring 196) is similarly mounted on a block 1188 which is slidable forwardly and rearwardly on a block 1202 mounted for heightwise adjustment on the head 50. The blocks 1188 and 1202 are left-hand counterparts of the blocks 188 and 202, the blocks 202 and 1202 differing somewhat in shape to avoid interference with other members.

It is evident that the blocks 202 and 1202, as above described, constitute guideways for the knife blocks 188 and 1188, respectively, and that they serve to control both the orientation and the lateral positions of the knife blocks.

The knives 66 and 64 are shifted forwardly and rearwardly by mechanism comprising a lever 772 fulcrumed upon a shoulder stud 774. A link or bar 776 is pivotally connected at its forward end by a shoulder stud 778 to an ear 780 extending from the block 188, and at its rearward end by a shoulder stud 782 to the lever 772. A similar link or bar 784 is pivotally connected at its forward end by a shoulder stud 786 to an ear 788 extending from the block 1188, and at its rearward end by a shoulder stud 790 to the lever 772. The shoulder studs 782 and 790 are equidistant from the fulcrum 774, and the fulcrum 774 is always on the longitudinal center line of the machine, and the shoulder studs 778 and 786 are always equidistant from the longitudinal center line. It is therefore evident that if either of the knives 66 or 64 is advanced by the swinging of the lever 772 about its fulcrum, the other knife is retracted to an equal extent. Swinging of the lever 772 to shift the knives is effected by a rod 792 pivotally connected by a shoulder stud 794 to the lever 772 and passing through a guide sleeve 796 having a stem 798 by which the sleeve is mounted on the head 50. In order to accommodate slight angular movements of the rod 792, the bearing opening in the guide sleeve 796 is not cylindrical, but is in the form of a pair of diverging cones, somewhat like a Venturi tube or an hourglass. A spring-pressed plunger 800 slidable in an axial bore in the stem 798 frictionally holds the rod 792 against undesired movement. A lateral extension 802 on the rod 792 serves as a finger piece to facilitate shifting of the knives by the operator.

The adjustments associated with the knife shifting mechanism for determining the operating positions of the knives will now be described. The fulcrum stud 774 of the shifting lever 772 is secured in a lateral extension 804 of an L-shaped slide 806 having a finger piece 808 to facilitate operation. The slide 806 slidingly engages the right-hand face of the head 50 and is secured in adjusted position thereon by a screw 810 (Fig. 30) threaded into the head 50 and extending through a slot 812 in the slide. A block 814 fixed to the head 50 cooperates with the screw 810 in supporting the slide 806. Also mounted on the head 50 is a U-shaped slide having a pair of parallel arms 816 and 818 joined by a cross bar 820. The arm 816 slidingly engages the left-hand face of the head 50 and is guided and supported by a block 822 fixed to the head, the block 1202 being suitably recessed to avoid interference with the arm. The U-shaped slide 816, 818, 820 is secured in adjusted position on the head 50 by a screw 824 (Fig. 31) threaded into the head and extending through a slot 826 in the arm 816, and also by a screw 828 (Fig. 30) extending up through a slot formed in a lateral horizontal flange 830 of the arm 818, the screw 828 being threaded into an overhanging portion of the head. The screws 824 and 828 cooperate with the block 822 in supporting and guiding the U-shaped slide 816, 818, 820. For convenience of adjustment, scale markings (Fig. 31) are formed on the arm 816 for registration with an index mark on the block 822. Threaded through the opposite end portions of the cross bar 820 are a pair of stop screws 832 and 834, engageable respectively with the rearward ends of the links 784 and 776 to determine the rearward positions of the respective knives 64 and 66.

Associated with the mechanism just described is a third slide 836 (Figs. 30 and 29) which slidably engages a face of the arm 818 and which is guided and supported by the flange 830 and a similar horizontal flange 838 also extending from the arm 818. The rearward end of the slide 836 is engageable with a slabbed off surface of a pin 840 extending from the slide 806. A screw 842 threaded into the arm 818 and extending through a slot 844 in the slide 836 adjustably clamps the slide to the arm and helps to guide and support the slide. A pointer 846 on the slide 836 cooperates with scale markings on a plate 848 fixed on the arm 818 to facilitate adjustment. For convenience of illustration these scale markings are shown in Fig. 30 as on the lateral edge of the plate 848; actually, they are on the flat horizontal top face of the plate.

To make the various adjustments associated with the above-described knife shifting mechanism, the screws 824, 828 and 810 are loosened and the slide 816, 818, 820 and also the slide 806 (with the ends of the links 784 and 786 against the stop screws 832 and 834) are moved to bring the knives 64 and 66 approximately to the desired positions for standard work. When in such positions, the knives may be collinear with the indenting tool 58 which always occupies a fixed position on the head 50 and which cooperates with the die 48 to impress a line of indentations to mark an assumed heel breast line on the insole. The knives need not, however, be collinear with the indenting tool 58 but, if desired, may be brought into positions forward or rearward of the assumed breast line, according to the practice of the particular shoe factory in which the machine is installed. The scale markings registering with the index mark on the block 822 may be helpful in making this adjustment. When the knives have been positioned approximately, the screws 824 and 828 are tightened, and the screws 832 and 834 (with the ends of the links 784 and 776 against them) are turned to bring the knives exactly into the desired positions, with the cutting edges of the knives collinear with each other. This is a setting up adjustment and is seldom changed.

For standard work the screw 810 is now tightened and no further adjustment is needed. For orthopedic work, however, the screw 842 is loosened and, with the screw 810 also loose, the slide 836 is moved to bring the pointer 846 into register with the scale marking indicating the desired amount of offset (or fore and aft displacement) of the knives. It may be noted that the scale markings are spaced at half the actual offset of the knives, since the movement of the fulcrum 774 is only half as great as the relative movement of the links 784 and 776. The operator then tightens the screw 842, pulls on the finger piece 808, if necessary, to bring the pin 840 against the end of the slide 836, and tightens the screw 810. This adjustment, having once been made, is changed only when orthopedic insoles of different types are to be operated upon. In operating upon orthopedic insoles he uses the finger piece 802 to bring the links 784 and 776 alternatively against their associated stop screws 832 and 834, one of the stop screws serving for right insoles and the other for left. He can readily reset the machine for standard work by loosening the screw 810, using the finger piece 808 to bring both links 784 and 776 against their associated stop screws, and retightening the screw 810. To reset the machine again for orthopedic work, he has merely to loosen the screw 810, pull on the finger piece 808 to bring the pin 840 against the end of the slide 836, and tighten the screw 810.

Having thus described my invention what I claim as new and desire to secure by Letters Patent of the United States is:

1. In a machine for operating upon shoe soles, a work table for supporting a sole, a head movable toward and from the work table, a tool upon the head for operating upon the sole, a pair of toggle links having adjacent ends, a toggle pin pivotally connecting said adjacent ends, a pivotal connection between the remote end of one toggle link and the head, a supporting arm, a pivotal connection between the remote end of the other toggle link and the supporting arm, a connecting rod pivotally attached at one of its ends to the toggle pin, means for driving the other end of the connecting rod to advance and retract the toggle pin and thereby to move the head toward and from the work table, a pivotal support for said supporting arm substantially coaxial with the toggle pin when the toggle pin occupies a position of greatest retraction, and means for holding the supporting arm in a desired position of angular adjustment about its pivotal support to determine the distance to which the head can approach the work table.

2. A machine as defined in claim 1, including also a pair of indicating members comprising a pointer and a cooperating arcuate scale coaxial with the pivotal support of the supporting arm, one of said indicating members being stationary and the other being carried by the supporting arm to guide the operator in adjusting the distance to which the head can approach the work table.

3. In a machine for operating on shoe soles, a work support, a tool for operating upon a sole on the work support, a carrier for the tool constructed and arranged to guide the tool for heightwise movement, a toggle having upper and lower toggle links, an operating pin pivotally connecting the toggle links at their adjacent ends, an adjustable thrust-sustaining pin pivotally supporting the upper end of the upper toggle link, a pivotal connection between the lower end of the lower toggle link and the carrier, driving means for moving the operating pin through a predetermined distance from an initial position wherein the toggle is broken and the tool is up to an operating position wherein the toggle is almost straight and the tool is down and for returning the operating pin to its initial position, a supporting arm for the adjustable pin, and a pivotal mounting about which the supporting arm can be swung for adjustment to vary the position of the adjustable pin and thereby the extent to which the tool descends when the toggle links are almost straight, the pivotal mounting of the supporting arm being substantially coaxial with the toggle operating pin when the latter is in its initial position.

4. A machine as defined in claim 3, including also means for holding the supporting arm against yielding from a position of adjustment under the influence of the thrust developed in the toggle links by the engagement of the tool with the sole.

5. A machine according to claim 3, including also an adjusting screw for moving the supporting arm into a position of adjustment and for holding the supporting arm in its position of adjustment against the thrust developed in the toggle links by the engagement of the tool with the sole.

6. A machine according to claim 3, including also a pair of indicating members comprising a pointer and a cooperating arcuate scale coaxial with the pivotal support of the supporting arm, one of said indicating members being stationary and the other being carried by the supporting arm to facilitate adjustment of the extent to which the tool descends.

7. A machine as defined in claim 3, including also a connection between the tool carrier and the supporting arm constructed and arranged to swing the supporting arm into a position of adjustment as the tool carrier descends.

8. A machine as defined in claim 3, including also a tension spring through which the carrier in descending yieldingly pulls the supporting arm into a position of adjustment.

9. A machine as defined in claim 3, including also a connection between the tool carrier and the supporting arm constructed and arranged to swing the supporting arm into a position of adjustment as the tool carrier descends, and means for holding the supporting arm against movement in a direction opposite to that in which it is swung by said connection.

10. A machine as defined in claim 3, including also a connection between the tool carrier and the supporting arm constructed and arranged to swing the supporting arm into a position of adjustment as the tool carrier descends, a slide connected to the supporting arm, a guideway along which the slide is moved by the supporting arm in its movement to adjusted position, and mechanism including a roll lock for preventing retrograde movement of the slide, said mechanism serving thereby to hold the supporting arm in its position of adjustment against the reactive thrust developed in the toggle links by the engagement of the tool with the sole.

11. A machine as defined in claim 3, including also a tension spring stretched between the tool carrier and the supporting arm for swinging the supporting arm into a position of adjustment as the tool carrier descends, and a rigid lost-motion spacing link interposed between the tool carrier and the supporting arm to control the position of the supporting arm in relation to the position of the tool carrier, the purpose of the lost motion of the spacing link being to permit yielding of the spring and further descent of the tool after the tool has engaged the sole and thereby transmitted an upward thrust through the toggle links which holds back the supporting arm from further movement of adjustment.

12. A machine as defined in claim 3, including also a tension spring stretched between the tool carrier and the supporting arm for swinging the supporting arm into a position of adjustment as the tool carrier descends, a rigid spacing link, a pivotal connection between one end of the spacing link and the tool carrier, a pivotal connection between the other end of the spacing link and the supporting arm, one of said pivotal connections having provision for lost motion to permit yielding of the spring and further descent of the tool after the tool has engaged the sole and thereby created an upward thrust in the toggle links which holds back the supporting arm from further movement of adjustment, and means providing for adjustment of the effective length of the spacing link.

13. A machine as defined in claim 3, wherein there are provided also a tension spring stretched between the tool carrier and the supporting arm for swinging the supporting arm into a position of adjustment as the tool carrier descends, a stop engageable with the supporting arm to determine the lowest position to which the tool carrier can descend, a rigid spacing link, a pivotal connection between one end of the spacing link and the tool carrier, a pivotal connection between the other end of the spacing link and the supporting arm, one of said pivotal connections having provision for lost motion to permit yielding of the spring and further descent of the tool after the tool has engaged the sole and thereby created an upward thrust in the toggle links which holds back the supporting arm from further movement of adjustment, and means for securing the pivotal connection between the spacing link and the supporting arm in a position of adjustment on the supporting arm along an arc coaxial with the pivotal connection between the spacing link and the tool carrier when the tool carrier occupies the lowest position permitted by said stop.

14. A machine as defined in claim 3, including also a stop for limiting the extent to which the supporting arm can be adjusted for the lowest position to which the tool carrier can descend.

15. A machine as defined in claim 3, including also a yielding connection between the tool carrier and the supporting arm constructed and arranged to swing the supporting arm into a position of adjustment as the tool carrier descends, and a stop engageable with the supporting arm for limiting the extent to which the yielding connection can move the supporting arm.

16. In a machine for operating upon shoe soles and having a work support, a tool engageable with a sole on the work support, means for guiding the tool for heightwise movement, a pair of toggle members having adjacent ends and remote ends, a pivotal connection between the adjacent ends of the toggle members, connecting means including a pivot between the remote end of one of the toggle members and the tool, a pivotal support for the remote end of the other toggle member, and means for moving the pivotal connection through a predetermined distance to cause a straightening movement of the toggle members and thereby to cause the tool to press against the sole on the work support, means for moving the pivotal support toward an operating position while the tool is approaching the sole, and means for holding the pivotal support against retraction from its operating position to enable it to sustain the thrust which develops in the straightening toggle members when the tool engages the sole, said operating position having thus been determined automatically by the thickness of the sole.

17. In a lip cutting and scoring machine, a pair of tools for operating on a sole, a head on which the tools are carried, guides on the head for guiding the tools for movement in parallel paths, and a connection between the tools including a lever transverse to the guides whereby the advance and retraction of each tool along its path is dependent upon the retraction and advance, respectively, of the other tool.

18. In a lip cuttting and scoring machine, a pair of tools for operating on the face of a sole adjacent to the lateral edges thereof, a head on which the tools are carried, guides on the head providing for movement of the tools in paths parallel to each other and longitudinal with respect to the sole, a connection between said tools including a transverse lever whereby the advance and retraction of each tool along its path is dependent upon the retraction and advance, respectively, of the other tool, and a pair of stops engaging said connection for limiting the advance and retraction of the tools.

19. In a lip cutting and scoring machine, a support for a sole, a pair of knives arranged to make transverse lip cuts on the sole, a head on which the knives are carried, said head being movable downwardly to bring the knives into operative engagement with the sole on the support, guides on the head providing for movement of the knives in paths parallel to each other and longitudinal with respect to the sole, and a connection between said knives including a transverse lever whereby the advance and the retraction of each knife along its path is dependent upon the retraction and the advance, respectively, of the other knife.

20. In a lip cutting and scoring machine, a pair of lip cutting knives, a head on which the knives are carried, guides on the head providing for movement of the knives in parallel paths, a connection between the knives including a lever transverse to the guides whereby the advance and the retraction of each knife along its path is dependent upon the retraction and the advance, respectively, of the other knife, and a pair of stops engaging said connection for limiting the advance and the retraction respectively of the knives.

21. In a lip cutting and scoring machine, a pair of lip cutting knives, a head on which the knives are carried, parallel guides on the head providing for movement of the knives, a connection between the knives including a lever transverse to the guides, a fulcrum for the lever positioned between the guides whereby the advance and the retraction of each knife along its guide is dependent upon the retraction and the advance, respectively, of the other knife, a pair of stops disposed on opposite sides of a center line parallel to the guides and passing through the fulcrum of the lever, the stops engaging said connection to limit the advance and retraction of the knives, and a common support for the stops adjustable in the direction of the parallel guides to vary the extent to which the knives can be advanced and retracted.

22. In a lip cutting and scoring machine, a pair of lip cutting knives, a head on which the knives are carried, parallel guides on the head providing for movement of the knives, a connection between the knives including a lever transverse to the guides, a movable fulcrum for the lever positioned between the guides whereby the advance and the retraction of each knife along its guide is dependent upon the retraction and the advance, respectively, of the other knife, means for guiding said fulcrum for movement of adjustment on the head in a direction parallel to the guides already mentioned, and means for securing the fulcrum in adjusted position.

23. In a lip cutting and scoring machine, a support for a sole, a pair of lip cutting knives, a head on which the knives are carried with provision for movement relatively to each other in a direction longitudinal of the sole, said head being movable downwardly to bring the knives into operative engagement with the sole on the support, connections for rendering the movement of each knife dependent on the movement of the other knife, a pair of stops arranged to limit the extent of the movements of the knives in opposite directions respectively, and a common support for said stops, said support being readily movable to and from a position wherein both stops operate to prevent movement of the knives in either direction.

24. In a machine for operating on shoe soles, a work table, a pair of tools engageable with a sole on the work table and longitudinally adjustable with respect to the sole for performing operations thereupon adjacent to the right and left edges thereof, a connection between the tools for coordinating their longitudinal adjustments into operating positions whereby when either tool is advanced the other is retracted, said connection being constructed and arranged to permit independent control of the orientations of the tools, and means independent of said connection for controlling the orientations of the tools.

25. In a machine for operating on shoe soles, a work table, a sole end gage for determining the longitudinal position of a sole on the work table, a pair of tools engageable with a sole on the work table and longitudinally adjustable with respect to the sole for performing operations thereupon adjacent to the right and left edges thereof, a connection between the tools for coordinating their longitudinal adjustments into operating positions whereby when either tool is advanced the other is retracted, said connection being constructed and arranged to permit independent lateral positioning of the tools, means independent of said connection for controlling the lateral positions of the tools, and means for moving the tools into operative engagement with the sole.

26. In a machine for operating on shoe soles, a work table, a sole end gage for determining the longitudinal position of a sole on the work table, a pair of tools engageable with the sole and longitudinally adjustable with respect thereto for performing operations thereupon adjacent to the right and left edges thereof, a pair of blocks in which said tools are respectively mounted, a air of bars, a transverse lever, a pivotal connection between one end of one bar and one of said blocks, a pivotal connection between the other end of said one bar and the lever, a pivotal connection between one end of the other bar and the other block, a pivotal connection between the other end of said other bar and the lever, a fulcrum about which the lever can swing, said fulcrum being between the pivotal connections which connect the bars to the lever whereby swinging of the lever about its fulcrum in one direction advances one tool and retracts the other, and swinging of the lever in the opposite direction retracts said one tool and advances the other, and means for moving the tools into operative engagement with the sole.

27. In a machine for operating on shoe soles, a work table, a sole end gage for determining the longitudinal position of a sole on the work table, a pair of tools engageable with the sole and longitudinally adjustable with respect thereto for performing operations thereupon adjacent to the right and left edges thereof, a pair of blocks in each of which one of said tools is mounted, a pair of bars, a transverse lever, a pivotal connection between one end of one bar and one of said blocks, a pivotal connection between the other end of said one bar and the lever, a pivotal connection between one end of the other bar and the other block, a pivotal connection between the other end of said bar and the lever, a fulcrum about which the lever can swing, said fulcrum being between the pivotal connections which connect the bars to the lever whereby swinging of the lever about its fulcrum in one direction advances one tool and retracts the other, and swinging of the lever in the opposite direction retracts said one tool and advances the other, means for controlling the orientations of the blocks, each independently of the other, and means for moving the tools into operative engagement with the sole.

28. In a machine for operating on shoe soles, a work table, a sole end gage for determining the longitudinal position of a sole on the work table, a pair of tools engageable with the sole and longitudinally adjustable with respect thereto for performing operations thereupon adjacent to the right and left edges thereof, a pair of blocks in each of which one of said tools is mounted, a pair of bars, a transverse lever, a pivotal connection between one end of one bar and one of said blocks, a pivotal connection between the other end of said one bar and the lever, a pivotal connection between one end of the other bar and the other block, a pivotal connection between the other end of said other bar and the lever, a fulcrum about which the lever can swing, said fulcrum being between the pivotal connections which connect the bars to the lever whereby swinging of the lever about its fulcrum in one direction advances one tool and retracts the other, and swinging of the lever in the opposite direction retracts said one tool and advances the other, means for determining the lateral position of each block independently of the other, and means for bringing the tools into operative engagement with the sole.

29. In a machine for operating on shoe soles, a work table, a sole end gage for determining the longitudinal position of a sole on the work table, a pair of tools engageable with the sole and longitudinally adjustable with respect thereto for performing operations thereupon adjacent to the right and left edges thereof, a pair of blocks in each of which one of said tools is mounted, a pair of bars, a transverse lever, a pivotal connection between one end of one bar and one of said blocks, a pivotal connection between the other end of said one bar and the lever, a pivotal connection between one end of the other bar and the other block, a pivotal connection between the other end of said other bar and the lever, a fulcrum about which the lever can swing, said fulcrum being the pivotal connections which connect the bars to the lever whereby swinging of the lever about its fulcrum in one direction advances one tool and retracts the other, and swinging of the lever in the opposite direction retracts said one tool and advances the other, a pair of stops for limiting the swinging of the lever in both directions to determine the operating positions of the tools, and means for bringing the tools into operative engagement with the sole.

30. In a machine for operating on shoe soles, a work table, a sole end gage for determining the longitudinal position of a sole on the work table, a pair of tools engageable with the sole and longitudinally adjustable with respect thereto for performing operations thereupon adjacent to the right and left edges thereof, a pair of blocks in each of which one of said tools is mounted, a pair of bars, a transverse lever, a pivotal connection between one end of one bar and one of said blocks, a pivotal connection between the other end of said one bar and the lever, a pivotal connection between one end of the other bar and the other block, a pivotal connection between the other end of said other bar and the lever, a fulcrum about which the lever can swing, said fulcrum being between the pivotal connections which connect the bars to the lever whereby swinging of the lever about its fulcrum in one direction advances one tool and retracts the other, and swinging of the lever in the opposite direction retracts said one tool and advances the other, a pair of guideways along which the respective blocks are slidable, and means for bringing the tools into operative engagement with the sole.

References Cited in the file of this patent
UNITED STATES PATENTS

| | | |
|---|---|---|
| 272,202 | Bradley | Feb. 13, 1883 |
| 344,997 | Shannon | July 6, 1886 |
| 544,519 | Pisko | Aug. 13, 1895 |
| 811,246 | Rogers | Jan. 30, 1906 |
| 921,573 | Ward | May 11, 1909 |
| 958,028 | Stewart | May 17, 1910 |
| 1,122,218 | Plant | Dec. 22, 1914 |
| 1,141,689 | Chandler | June 1, 1915 |
| 1,282,158 | Winter | Oct. 22, 1918 |
| 1,393,170 | Schmidinger | Oct. 11, 1921 |
| 1,421,539 | Neuenschwander | July 4, 1922 |
| 1,452,421 | Halvorsen et al. | Apr. 17, 1923 |
| 1,802,377 | Glass | Apr. 28, 1931 |
| 2,020,416 | Hood | Nov. 12, 1935 |
| 2,257,132 | Schoenky | Sept. 30, 1941 |
| 2,408,330 | Miller | Sept. 24, 1946 |
| 2,447,030 | Rosenlof | Aug. 17, 1948 |
| 2,472,968 | Goldberg | June 14, 1949 |